(12) United States Patent
Lee et al.

(10) Patent No.: US 10,788,977 B2
(45) Date of Patent: Sep. 29, 2020

(54) SYSTEM AND METHOD FOR DISPLAYING INFORMATION ON TRANSPARENT DISPLAY DEVICE

(71) Applicant: SAMSUNG ELECTRONICS CO., LTD., Suwon-si (KR)

(72) Inventors: Chang-soo Lee, Seosan-si (KR); Kyung-a Kang, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/002,829

(22) Filed: Jun. 7, 2018

(65) Prior Publication Data

US 2018/0292967 A1 Oct. 11, 2018
US 2019/0278452 A9 Sep. 12, 2019

Related U.S. Application Data

(63) Continuation of application No. 14/031,483, filed on Sep. 19, 2013, now Pat. No. 10,007,417.

(30) Foreign Application Priority Data

Sep. 19, 2012 (KR) .................. 10-2012-0104156
Sep. 4, 2013 (KR) .................. 10-2013-0106227

(51) Int. Cl.
*G06F 3/0488* (2013.01)

(52) U.S. Cl.
CPC ........ *G06F 3/0488* (2013.01); *G06F 3/04883* (2013.01); *G06F 2203/0383* (2013.01); *G06F 2203/04808* (2013.01)

(58) Field of Classification Search
CPC ............... G06F 3/0488; G06F 3/04883; G06F 2203/0383; G06F 2203/04808
See application file for complete search history.

(56) References Cited

U.S. PATENT DOCUMENTS 5,583,946 A * 12/1996 Gourdol .............. G06F 3/04883
345/179
7,199,787 B2 4/2007 Lee et al.
8,565,829 B2 10/2013 Kim et al.
(Continued)

FOREIGN PATENT DOCUMENTS

CN 1198204 C 4/2005
CN 102141851 A 8/2011
(Continued)

OTHER PUBLICATIONS

Communication dated Jan. 23, 2014, issued by the European Patent Office in counterpart European Application No. 13185054.7.
(Continued)

*Primary Examiner* — Jose R Soto Lopez
(74) *Attorney, Agent, or Firm* — Sughrue Mion, PLLC

(57) ABSTRACT

A method and system for displaying information on a transparent display device includes receiving a touch input for selecting an object displayed on a screen of an external device that is viewable through a screen of the transparent display device, requesting the external device for information related to the object, receiving the information related to the object from the external device, and displaying the received information on the screen of the transparent display device.

20 Claims, 18 Drawing Sheets

(56) References Cited

U.S. PATENT DOCUMENTS

| | | |
|---|---|---|
| 9,128,555 B2 | 9/2015 | Lee et al. |
| 2003/0025678 A1* | 2/2003 | Lee ................... G06F 3/0488 345/173 |
| 2003/0117379 A1* | 6/2003 | Carro ................ G06F 3/04883 345/173 |
| 2006/0001650 A1* | 1/2006 | Robbins ............ G06F 3/04845 345/173 |
| 2007/0253600 A1 | 11/2007 | Furukawa et al. |
| 2007/0300188 A1 | 12/2007 | Kim |
| 2008/0075351 A1* | 3/2008 | Smith ................ G06F 3/0488 382/141 |
| 2009/0091513 A1* | 4/2009 | Kuhn .................. G09F 9/35 345/4 |
| 2009/0295943 A1* | 12/2009 | Kim ................... H04N 5/2251 348/231.99 |
| 2010/0045570 A1* | 2/2010 | Takata ............... G06F 3/0481 345/4 |
| 2010/0053081 A1 | 3/2010 | Jee et al. |
| 2010/0138439 A1 | 6/2010 | Hong et al. |
| 2010/0138780 A1* | 6/2010 | Marano ............... G06F 3/147 715/804 |
| 2010/0245274 A1* | 9/2010 | Fukuda ............. G06F 3/04886 345/173 |
| 2010/0299436 A1* | 11/2010 | Khalid ................ G09G 5/006 709/226 |
| 2011/0080427 A1* | 4/2011 | Oda .................... G06F 3/04845 345/634 |
| 2011/0102354 A1* | 5/2011 | Fuyuno ............... G06F 1/1647 345/173 |
| 2011/0138317 A1* | 6/2011 | Kang ................ H04N 21/42222 715/780 |
| 2011/0138416 A1* | 6/2011 | Kang ................ H04N 21/42208 725/39 |
| 2011/0138444 A1* | 6/2011 | Kang .................. G06F 21/31 726/3 |
| 2011/0163986 A1* | 7/2011 | Lee ................... H04M 1/72544 345/173 |
| 2011/0246894 A1* | 10/2011 | Luo ..................... G06F 3/0488 715/733 |
| 2012/0001942 A1* | 1/2012 | Abe ..................... G09G 5/003 345/650 |
| 2012/0019434 A1* | 1/2012 | Kuhlman .............. G09G 3/36 345/1.3 |
| 2012/0069050 A1* | 3/2012 | Park .................. G06F 3/04883 345/632 |
| 2012/0072873 A1* | 3/2012 | Park .................... G06F 3/017 715/863 |
| 2012/0102438 A1* | 4/2012 | Robinson ............. G06F 3/011 715/863 |
| 2012/0102439 A1* | 4/2012 | Mitchell .............. G06F 3/011 715/863 |
| 2012/0105306 A1* | 5/2012 | Fleck ................... G06F 1/1643 345/1.1 |
| 2012/0105428 A1* | 5/2012 | Fleck .................. G06F 3/1438 345/419 |
| 2012/0105487 A1* | 5/2012 | Son .................... G06F 3/011 345/671 |
| 2012/0113028 A1 | 5/2012 | Marsden et al. |
| 2012/0113029 A1* | 5/2012 | Ye ...................... G06F 3/1454 345/173 |
| 2012/0256823 A1* | 10/2012 | Lee .................... G06F 3/011 345/156 |
| 2012/0256854 A1* | 10/2012 | Lee .................... G06F 3/017 345/173 |
| 2012/0256886 A1* | 10/2012 | Ryu ................... G06F 3/0488 345/204 |
| 2012/0265713 A1* | 10/2012 | Kim .................... G06Q 30/02 705/500 |
| 2013/0009863 A1* | 1/2013 | Noda .................. G06F 3/013 345/156 |
| 2013/0104054 A1* | 4/2013 | Cao .................... G06F 3/038 715/753 |
| 2013/0104172 A1* | 4/2013 | Lee .................... G06F 16/9032 725/60 |
| 2013/0135180 A1* | 5/2013 | McCulloch ........... G06Q 10/10 345/8 |
| 2013/0158703 A1* | 6/2013 | Lin ...................... G07F 9/023 700/232 |
| 2013/0194259 A1* | 8/2013 | Bennett ............... G06T 19/006 345/420 |
| 2013/0207896 A1* | 8/2013 | Robinson ............. G06F 3/04815 345/158 |
| 2013/0207948 A1* | 8/2013 | Na ...................... G09G 3/003 345/207 |
| 2013/0211583 A1* | 8/2013 | Borra ................... G07F 9/023 700/232 |
| 2013/0222238 A1* | 8/2013 | Sliger .................. G06F 3/03545 345/157 |
| 2013/0290882 A1* | 10/2013 | Cotte ................. H04N 21/42224 715/764 |
| 2013/0316767 A1* | 11/2013 | Cai ..................... A47F 11/06 455/566 |
| 2013/0335573 A1* | 12/2013 | Forutanpour ......... G06F 3/011 348/158 |
| 2013/0342427 A1* | 12/2013 | Cai ..................... G06K 9/00671 345/4 |
| 2013/0342696 A1* | 12/2013 | Cai ..................... G06K 9/22 348/148 |
| 2014/0035816 A1 | 2/2014 | Laio et al. |
| 2014/0035877 A1* | 2/2014 | Cai ..................... G06F 3/0488 345/175 |
| 2014/0059485 A1* | 2/2014 | Lehrian .............. G06F 3/04847 715/802 |
| 2014/0104316 A1* | 4/2014 | Sharma ............... G06F 1/1626 345/633 |

FOREIGN PATENT DOCUMENTS

| | | |
|---|---|---|
| CN | 102402287 A | 4/2012 |
| CN | 102402390 A | 4/2012 |
| EP | 2426597 A1 | 3/2012 |
| JP | 4517827 B2 | 8/2010 |
| KR | 10-2010-0099000 A | 9/2010 |
| KR | 10-2012-0029228 A | 3/2012 |
| TW | 201218067 A1 | 5/2012 |

OTHER PUBLICATIONS

Communication dated Dec. 26, 2013, issued in International Application No. PCT/KR2013/008399.

Communication dated Dec. 20, 2016, issued by the Taiwanese Patent Office in counterpart Taiwanese Application No. 102133303.

Communication dated Feb. 4, 2017, issued by the State Intellectual Property Office of P.R. China in counterpart Chinese Application No. 201380048814.6.

Communication dated Sep. 15, 2017 by the State Intellectual Property Office of P.R. China in counterpart Chinese Patent Application No. 201380048814.6.

Communication dated Feb. 11, 2020 issued by the European Patent Office in European Application No. 13185054.7.

Communication dated May 26, 2020, issued by the Korean Intellectual Property Office in corresponding Korean Application No. 10-2013-0106227.

* cited by examiner

SYSTEM AND METHOD FOR DISPLAYING INFORMATION ON TRANSPARENT DISPLAY DEVICE

CROSS-REFERENCE TO RELATED PATENT APPLICATION

This application is a continuation application of U.S. application Ser. No. 14/031,483, filed Sep. 19, 2013, in the U.S. Patent and Trademark Office, which claims priority from Korean Patent Application No. 10-2012-00104156, filed on Sep. 19, 2012, and Korean Patent Application No. 10-2013-00106227, filed on Sep. 4, 2013, in the Korean Intellectual Property Office, the disclosure of which is incorporated herein by reference in its entirety.

BACKGROUND

1. Field

Methods and apparatuses consistent with exemplary embodiments relate to displaying information, and more particularly, to a system and method for displaying information related to an external object or an external device on a transparent display device.

2. Description of the Related Art

Transparent display devices are considered next generation display devices. A transparent display device has a degree of transparency that enables a user to see an external object or an external device through the transparent display device.

However, a transparent display device does not display information related to the external object or the external device.

SUMMARY

Exemplary embodiments provide a system, a method, and an apparatus for displaying information related to an external device seen through a screen of a transparent display device on the screen of the transparent display device, and a recording medium thereof.

Exemplary embodiments also provide a system, a method, and an apparatus for displaying information related to an object displayed on a screen of an external device seen through a screen of a transparent display device on the screen of the transparent display device, and a recording medium thereof.

Exemplary embodiments also provide a system, a method, and an apparatus for displaying information related to an external object seen through a screen of a transparent display device on the screen of the transparent display device, and a recoding medium thereof.

According to an aspect of an exemplary embodiment, there is provided a method of displaying information on a transparent display device, the method including: receiving a touch input on the transparent display device that selects an object displayed on an external device that is viewable through a screen of the transparent display device; requesting the external device for information related to the object; receiving the information related to the object from the external device; and displaying the received information on the screen of the transparent display device.

The touch input may indicate a contour line of the object that is viewable through the screen, a tap-based touch indicating a location on the screen at which the object is viewable through the screen, or indicate a closed region on the screen at which the object is viewable through the screen.

The information related to the object indicates at least one other object having a type that is the same as a type of the object, and a display location on a screen of the external device of the at least one other object differs from that of the object.

The information related to the object indicates information that is not displayed on a screen of the external device.

The displaying comprises displaying the received information at a display location on the screen of the transparent display device that corresponds to a display location of the object on a screen of the external device.

The method may further include editing the information that is displayed on the screen of the transparent display device based on an interaction between the transparent display device and the external device.

The method may further include displaying information related to the external device based on an augmented reality service on the screen of the transparent display device.

The requesting and the receiving the information are performed based on one of a direct communication between devices, a communication via a server, and a communication via a repeater.

According to another aspect of an exemplary embodiment, there is provided a transparent display device including: a transparent display configured to receive a touch input that selects an object displayed on an external device that is viewable through the transparent display; a communication unit configured to communicate with an external device that is viewable through the transparent display; and a processor configured to request the external device for information related to the object based on the touch input, via the communication unit, receive information related to the object from the external device in response to the request, via the communication unit, and control the transparent display to display the received information.

According to another aspect of an exemplary embodiment, there is provided a method of displaying information on a transparent display device, the method including: receiving a first touch input on a screen of the transparent display device indicating first position information of an external device that is viewable through the screen of the transparent display device and receiving a second touch input on the screen of the transparent display device indicating second position information of an object displayed on a screen of the external device viewable through the screen of the transparent display device; requesting the external device for information related to the object based on the first position information and the second position information; receiving information related to the object from the external device in response to the requesting; and displaying the received information on the screen of the transparent display device.

The first position information indicates a contour line of the external device viewable through the screen of the transparent display device.

The first touch input may be independent touch operations on a first point and a second point on the screen of the transparent display device that indicate a contour line of the external device that is viewable through the screen of the transparent display device.

The first touch input may be a touch-and-drag operation for connecting a first point and a second point on the screen of the transparent display device that indicates a contour line of the external device that is viewable through the screen of the transparent display device.

The first touch input may indicate a touch-based region adjusting operation for guide information displayed on the screen of the transparent display device, and a range related to the touch-based region adjusting operation for the guide information may be based on a contour line of the external device that is viewable through the screen of the transparent display device.

The first touch input may be a touch operation for selecting screen information of the external device, wherein the screen information may be included in a selectable screen information menu item about the external device, which is displayed on the screen of the transparent display device, and the screen information may include at least one of screen size information and screen type information.

The second position information may indicate a contour line of the object that is viewable through the screen on the transparent display device.

The second touch input may be a tap-based touch indicating a location on the screen of the transparent display device at which the object is viewable through the screen of the transparent display device.

The second touch input may indicate a closed region on the screen of the transparent display device through which the object is viewable on the screen of the transparent display device.

The information related to the object may indicate at least one other object having a type that is the same as a type of the object, and a display location on the screen of the external device of the at least one other object may differ from that of the object.

The method may further include editing the information that is displayed on the screen of the transparent display device based on an interaction between the transparent display device and the external device.

According to another aspect of an exemplary embodiment, there is provided a transparent display device including: a transparent display configured to receive a touch input indicating first position information of an external device that is viewable through the transparent display, and to receive a second touch input indicating second position information of an object displayed on a screen of the external device viewable through the transparent display; a communication unit configured to communicate with the external device; and a processor configured to request the external device for information related to the object based on the first position information and the second position information, via the communication unit, receive information related to the object from the external device in response to the request, via the communication unit, and display the received information on the transparent display.

According to another aspect of an exemplary embodiment, there is provided a method of displaying information on a screen of a transparent display device, the method including: receiving from the transparent display device a request for information related to at least one object displayed on the screen of an external device that is viewable through a screen of the transparent display device; selecting the at least one object in response to the request; and transmitting the information related to the selected object to the transparent display device, wherein the request for information related to the object comprises first position information of the external device indicated by a first touch input on the transparent display device and second position information of the object displayed on the screen of the external device indicated by a second touch input on the transparent display device.

According to another aspect of an exemplary embodiment, there is provided a non-transitory computer-readable recording medium having embodied thereon a program for implementing the methods discussed of displaying information on the transparent display device.

BRIEF DESCRIPTION OF THE DRAWINGS

The above and other aspects will become more apparent by describing in detail exemplary embodiments thereof with reference to the attached drawings in which.

DETAILED DESCRIPTION OF THE EXEMPLARY EMBODIMENTS

Figure 1A:
FIG. 1A through FIG. 1C are block diagrams of an information display system according to an exemplary embodiment.

As the exemplary embodiments allow for various changes and numerous embodiments, particular exemplary embodiments will be illustrated in the drawings and described in detail in the written description. However, this is not intended to limit the exemplary embodiments to particular modes of practice, and it is to be appreciated that all changes, equivalents, and substitutes that do not depart from the spirit and technical scope of the disclosure are encompassed. In the description, certain explanations of well known related art are omitted.

While such terms as "first," "second," etc., may be used to describe various components, such components must not be limited to the above terms. The above terms are used only to distinguish one component from another.

The terms used in the present specification are merely used to describe particular exemplary embodiments, and are not intended as limiting. All terms including descriptive or technical terms used herein should be construed as having meanings that would be understood to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description. Thus, the terms used herein have to be defined based on the meaning of the terms together with the description throughout the specification. Screens suggested in the present application are used only for descriptive purposes, and are not intended as limiting.

An expression used in the singular encompasses the expression of the plural, unless it has a clearly different meaning in the context. In the present specification, it is to be understood that the terms such as "including" or "having," etc., are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

As used herein, the term "and/or" includes any and all combinations of one or more of the associated listed items. Expressions such as "at least one of," when preceding a list of elements, modify the entire list of elements and do not modify the individual elements of the list.

An object denotes a component or information displayed on an external device or a screen of the external device of a transparent display device. For example, an object may include an image, an image included in another image, an icon, a folder icon, an icon included in a folder icon, text, a pop-up window, an application execution window, a content included in an application execution window, a list, an item, a content, and a file included in a list; however, the present invention is not limited thereto. Examples of object will be described in detail in various examples of screens that will be described later. The object may be referred to as an external object of the transparent display device.

Throughout the entire specification, a touch input denotes input information of a user input through a touch-based gesture using a finger of the user or a touch tool. The touch tool may be referred to as an external input device, a stylus, or a stylus pen.

The touch-based gesture may be variously defined. In other words, examples of the touch-based gesture may include touch-based motions on a touch screen, such as tap, touch-and-hold, double tap, drag, touch-and-drag, panning, flick, drag-and-drop, sweep, and swipe, but the touch-based gesture is not limited thereto.

The touch input may be replaced by a gesture based on an image captured by a camera, according to an input desired to represent based on the touch. For example, if the touch input is an input for selecting an object displayed on an external device, the touch input may be replaced by a gesture or operation according to a moving direction or sign of the hand captured by the camera. The camera may be configured based on an image sensor or an optical sensor.

The touch input may be replaced by a user voice signal based on natural language, according to an input desired to represent based on the touch. For example, if a touch input is an input for selecting an object including a certain letter or a name displayed on an external device, the touch input may be replaced by a user voice signal based on natural language representing the certain letter or the name of the object.

Hereinafter, exemplary embodiments will be described in detail with reference to accompanying drawings, wherein like reference numerals denote like elements to not provide repeated descriptions.

FIG. 1A is a block diagram of an information display system according to an exemplary embodiment.

Referring to FIG. 1A, the information display system includes a transparent display device 100 and an external device 110. However, the information display system is not limited to the example shown in FIG. 1A. That is, the information display system may further include other components, in addition to the components shown in FIG. 1A.

Figure 1B:
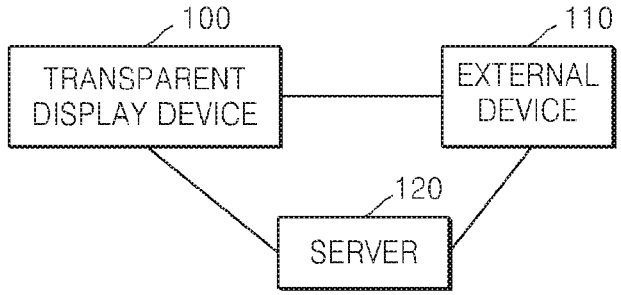

For example, as shown in FIG. 1B, the information display system may further include a server 120. In this case, the transparent display device 100 and the external device 110 may transmit and/or receive information via the server 120, and the transparent display device 100 may receive information based on an augmented reality service about the external device 110 from the server 120. The communication through the server 120 may be wired or wireless internet, but is not limited thereto. The server 120 may include at least one of a cloud server, an information supply server, and a service server. The server 120 may manage and provide information based on the augmented reality service.

Figure 1C:
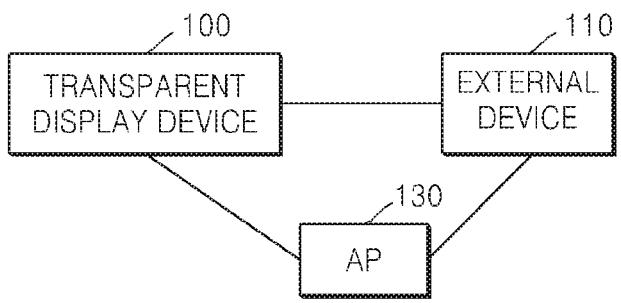

The information display system may further include an access point 130, as shown in FIG. 1C. In this case, the transparent display device 100 and the external device 110 may transmit and/or receive information via the access point 130. The communication method via the access point 130 may be, for example, a wireless LAN communication method of infrastructure mode (or WiFi), but is not limited thereto.

When the information display system is configured as shown in FIG. 1A, the transparent display device 100 and the external device 110 may transmit and/or receive information through a device-to-device direct communication. The device-to-device direct communication method may use, for example, a local area wireless communication method such as wireless LAN communication of Ad-hoc mode such as WiFi-direct, Bluetooth communication, ultra wideband (UWB) communication, and Zigbee communication, but is not limited thereto.

That is, the transparent display device 100 and the external device 110 may be connected to each other via a wire. For example, the transparent display device 100 and the external device 110 may be connected to each other via a universal serial bus (USB) or a universal asynchronous receiver/transmitter (UART) to transmit/receive data. The device-to-device direct communication method may be referred to as a machine-to-machine (M2M) communication method, a device-to-device (D2D) communication method, or a peer-to-peer (P2P) communication method.

Therefore, the communication between the transparent display device 100 and the external device 110 may be performed based on one of the direct communication between devices, the communication method via the access point 130, and the communication method via the server 120, according to elements of the information display system, but is not limited thereto.

The transparent display device 100 and the external device 110 may transmit and/or receive at least one of size information thereof, owner information thereof, and information sharable with other devices, through a short distance communication method such as a near field communication (NFC).

The size information of the device may be represented as, for example, (width×length×thickness) mm, but is not limited thereto. Screen information may include screen size information and screen type information, and is not limited thereto. The screen size information may be represented as, for example, A4, B5, 7 inches, or 5.5 inches, and is not limited thereto. The screen type information may represent whether the screen is a touch screen or a non-touch screen, and is not limited thereto. For example, the screen type information may represent whether the screen is a liquid crystal display (LCD) panel or an active matrix organic light emitting diodes (AMO LED) panel.

The transparent display device 100 may display the information about the external device 110, which is transmitted from the external device 110 via a short distance communication method, such as the NFC, as information about the external device 110 based on the augmented reality service. For example, the transparent display device 100 may display the information about the external device 110 on a display area adjacent to the external device 110 that is seen through the transparent display device 100. The display area is a part of a screen of the transparent display device 100. The external device 100 that is seen through the transparent display device 100 may be referred to as the external device 100 that is seen via the screen of the transparent display device 100.

The transparent display device 100 is a device having a transparent display. For example, the transparent display device 100 may be a mobile phone having a transparent display, a smartphone having a transparent display, a notebook computer having a transparent display, a tablet PC having a transparent display, a handheld PC having a transparent display, an electronic book terminal having a transparent display, a digital broadcasting terminal having a transparent display, a personal digital assistant (PDA) having a transparent display, a portable multimedia player (PMP) having a transparent display, a navigation device having a transparent display, a smart TV having a transparent display, a consumer electronic (CE) device having a transparent display (for example, a refrigerator having a transparent display, an air conditioner having a transparent display, a dish washing machine having a transparent display, etc.), and an iOS-convertible device having a transparent display, but is not limited thereto. The transparent display may be applied to various fields such as high added-value glass, glass as a functional car element, car dashboard, navigators, security electronic devices, solar batteries, electronic devices for military, game consoles, toys, and show windows, as well as smart windows. The screen of the transparent display device 100 may be referred to as a screen on the transparent display.

The transparent display device 100 may provide application execution function, communication function, media player function, web-browsing function, word-processing function, e-mail transmission function, messenger function, and/or data storage function, but is not limited thereto.

The transparent display device 100 requests information related to at least one object that is displayed on the external device 110 and seen through the transparent display device 100, based on a touch input. When receiving the information related to the object from the external device 110, the transparent display device 100 displays the received information.

The external device 110 is a device that is seen through the transparent display device 100, through the screen of the transparent display device 100, or through the transparent display of the transparent display device 100. The external device 110 may be referred to as another device. The external device 110 may not include a transparent display. For example, the external device 110 may be a mobile phone, a smartphone, a notebook computer, a tablet PC, a handheld PC, an electronic book terminal, a digital broadcasting terminal, a PDA, a PMP, a navigation, a smart TV, a CE device (for example, a refrigerator, an air conditioner, a dishwashing machine having a display panel, etc.), and an iOS convertible device, but is not limited thereto. That is, the external device 110 may include a transparent display.

The external device 110 may provide application execution function, communication function, media player function, web-browsing function, word-processing function, e-mail transmission function, messenger function, and/or data storage function, but is not limited thereto.

When the transparent display device 100 requests the information related to at least one object that is displayed, the external device 110 selects the requested object and transmits information related to the requested object to the transparent display device 100.

Figure 2:
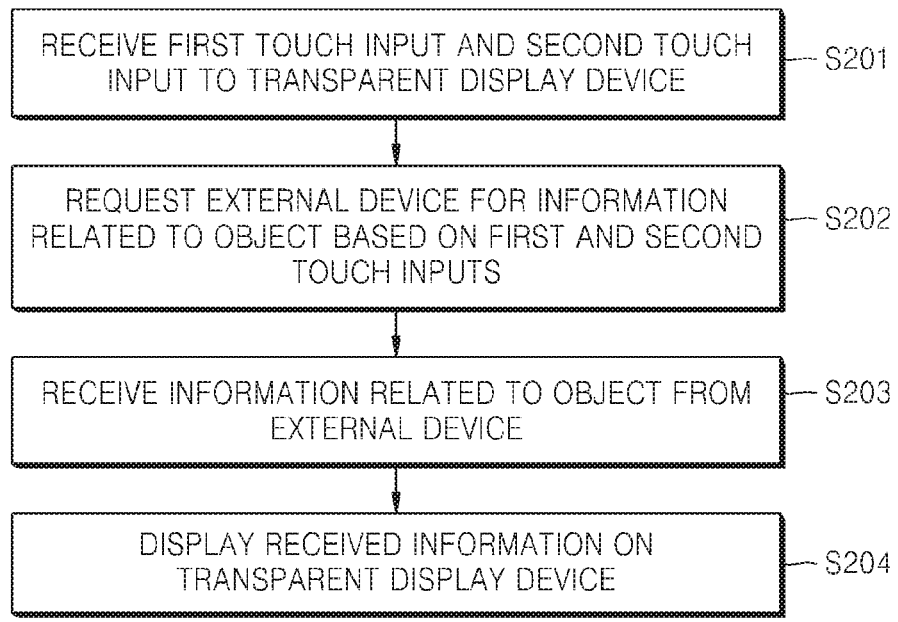
FIG. 2 is a flowchart illustrating a method of displaying information in a transparent display device, according to an exemplary embodiment.

FIG. 2 is a flowchart illustrating a method of displaying information to be performed by the transparent display device 100, according to an exemplary embodiment.

In operation S201, the transparent display device 100 receives a first touch input and a second touch input. The first touch input represents reference information of the external device 110 that is seen through the transparent display device 100. The reference information is used to detect a display location of the object on the external device 110, wherein the object is selected by the second touch input in the transparent display device 100. The reference information may be referred to as first position information of the external device 110.

Figure 3A:
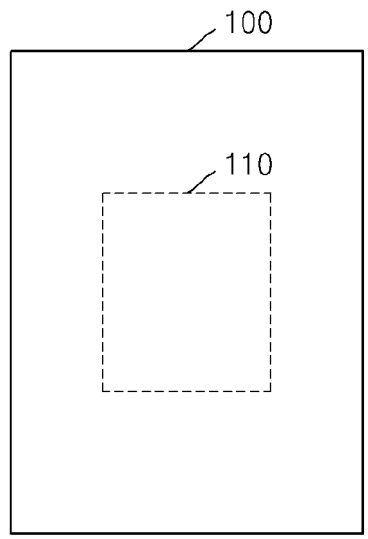
FIGS. 3A through 3H are diagrams showing examples of a first touch input according to exemplary embodiments.

FIGS. 3A through 3H are diagrams showing examples of the first touch input. In FIGS. 3A through 3H, the transparent display device 100 has a size that is greater than that of the external device 110, and the external device 110 is seen through the transparent display device 100 as shown in FIG. 3A. In the examples shown in FIGS. 3A through 3H, a result of sensing the first touch input may or may not be displayed on the transparent display device 100.

Figure 3B:
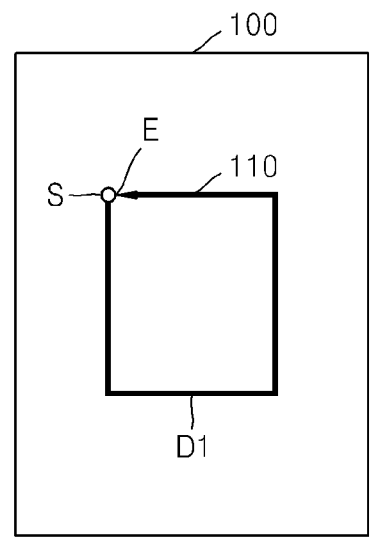

FIG. 3B shows an example in which the first touch input is drawn along a contour line of the external device 110 that is seen through the transparent display device 100. The contour line of the external device 110 may be referred to as a boundary of the screen of the external device 110. The first touch input may be referred to as a first input that identifies the boundary of the screen of the external device 110. The first touch input shown in FIG. 3B is based on drawing operation from a point S on the external device 110 that is seen through the transparent display device 100 along the contour line of the external device 110 to a point E. The point S denotes a start point of the touch operation, that is, a drawing operation along the contour line of the external device 110. The point E denotes an end point of the touch operation along the contour line of the external device 110. The point S and the point E may have the same display location (or xy coordinates). However, the point S and the point E may be adjacent to each other so that a closed area may be set according to the touch operation for drawing along the contour line of the external device 110.

In FIG. 3B, the point S is a left uppermost corner in the contour line of the external device 110, but is not limited thereto. That is, the point S may be an arbitrary point on the contour line of the external device 110. The point E is determined depending on the point S.

Figure 3C:
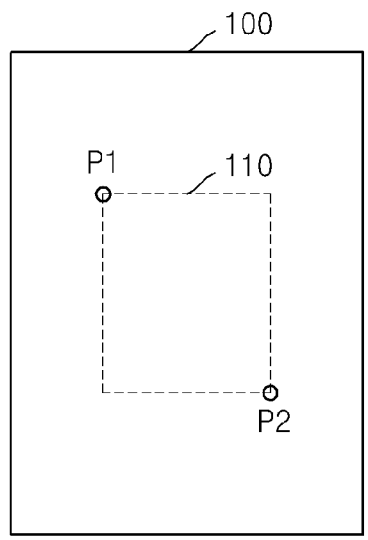
Figure 3D:
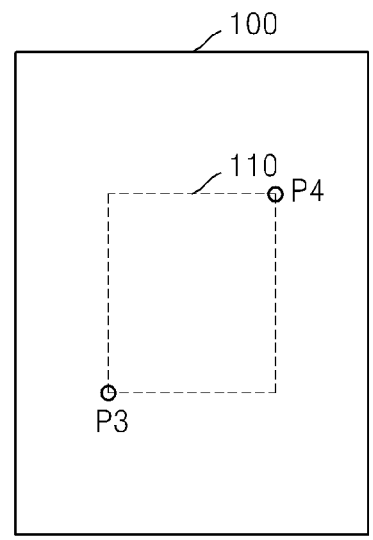

In FIGS. 3C and 3D, the first touch input is based on independent touch operations at a first point and a second point on the transparent display device 100. In FIGS. 3C and 3D, the first point and the second point are in a diagonal relationship on the contour line of the external device 110 that is seen through the transparent display device 100.

Referring to FIG. 3C, the first point is a left uppermost point P1 on the contour line of the external device 110, and the second point is a right lowermost point P2 on the contour line of the external device 110. Because the point P1 and the point P2 are independently touched, the transparent display device 100 may trace the contour line of the external device 110 that is seen through the transparent display device 100 based on information about xy coordinates of the point P1 and the point P2 on the transparent display device 100. That is, (x, y) coordinate information of a right uppermost point and a left lowermost point of the contour line, which are not touched, is detected based on the (x, y) coordinate information of the point P1 and the point P2, and the detected points are connected to each other to trace the contour line of the external device 110.

Referring to FIG. 3D, the first point is a left lowermost point P3 on the contour line of the external device 110 and the second point is a right uppermost point P4 on the contour line of the external device 110. When the point P3 and the point P4 are touched, the transparent display device 100 may trace the contour line of the external device 110 that is seen through the transparent display device 100 based on the xy coordinate information of the point P3 and the point P4 on the transparent display device 100. The tracing of the contour line may be performed in the same way as described with reference to FIG. 3C.

FIGS. 3E through 3H show examples where the first touch input is based on a touch-and-drag operation connecting the first point and the second point to each other on the transparent display device 100. In FIGS. 3E through 3H, the first point and the second point are in the diagonal relationship with each other based on the contour line of the external device 110 that is seen through the transparent display device 100. In the examples shown in FIGS. 3E through 3H, the first point may denote a start point S and the second point may denote an end point E.

Figure 3E:
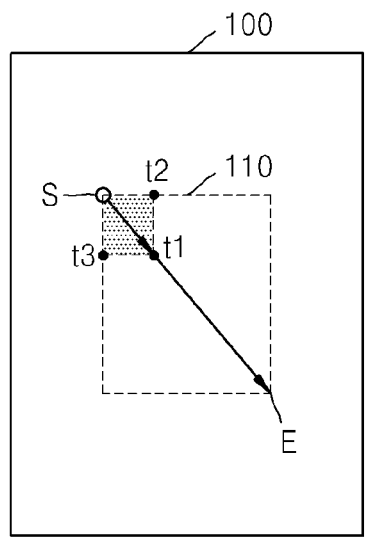

Referring to FIG. 3E, the point S is a left uppermost point on the contour line of the external device 110 and the point E is a right lowermost point on the contour line of the external device 110. Since the touch-and-drag operation is performed toward the point E after touching the point S, the transparent display device 100 may trace the contour line of the external device 110. That is, as shown in FIG. 3E, when a touch point according to the touch-and-drag operation is t1, (x, y) coordinate information of a point t2 and a point t3 on the contour line, wherein the points t2 and t3 are not touched, is detected based on the (x, y) coordinate information of the point S and the (x, y) coordinate information of the point t1, and then, the contour line of the external device 110 may be traced by connecting the point S, the points t1, t2, and t3 based on the (x, y) information thereof.

The transparent display device 100 may display an arrow or a block setting shown in FIG. 3E based on a current touching location to show variation of the touched location according to the dragging. When the touch-and-drag operation finishes at the point E, the transparent display device 100 may end the arrow or the block setting display, and may display the contour line of the external device 110. Otherwise, the arrow or the block display status may be maintained.

Figure 3F:
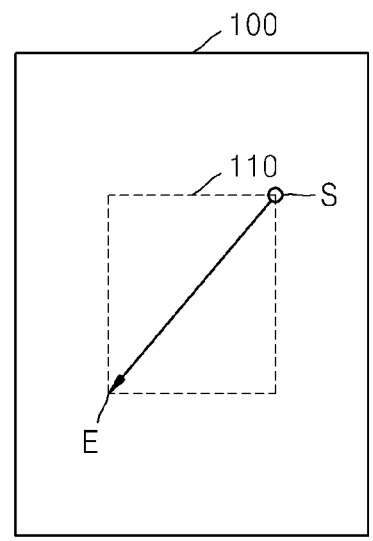
Figure 3G:
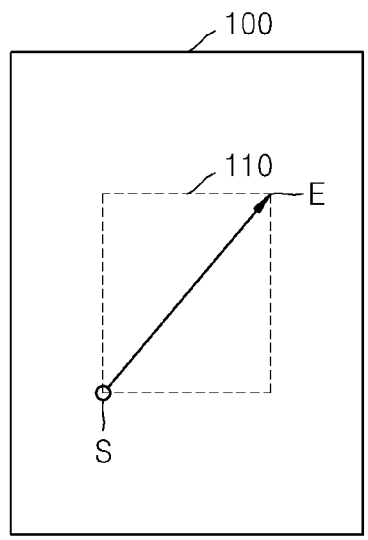
Figure 3H:
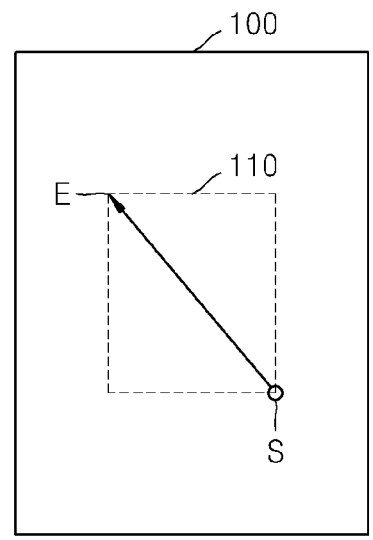

FIG. 3F shows a case where the start point S of the touch-and-drag operation is the right uppermost point on the contour line of the external device 110 and the end point E is the left lowermost point on the contour line of the external device 110. FIG. 3G shows a case where the start point S of the touch-and-drag operation is the left lowermost point on the contour line of the external device 110 and the end point E is the right uppermost point on the contour line of the external device 110. FIG. 3H shows a case where the start point S of the touch-and-drag operation is the right lowermost point on the contour line of the external device 110 and the end point E is the left uppermost point on the contour line of the external device 110.

Figure 4A:
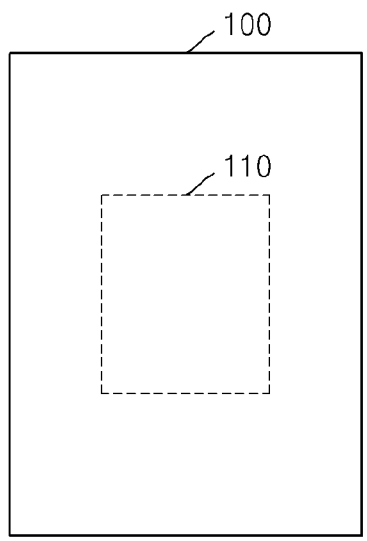
FIGS. 4A through 4E are diagrams showing other examples of a first touch input according to exemplary embodiments.

FIGS. 4A through 4E are diagrams showing other examples of the first touch input. In FIGS. 4A through 4E, the transparent display device 100 is larger than the external device 110, and as shown in FIG. 4A, the external device 110 is seen through the transparent display device 100. In the examples shown in FIGS. 4A through 4E, a result of sensing the first touch input may or may not be displayed on the transparent display device 100.

In FIGS. 4A through 4E, the first touch input is based on a touch-based operation for adjusting a region with respect to guide information displayed on the transparent display device 100, and the adjustable range of the guide information based on the touch operation is based on the contour line of the external device 110 that is seen through the transparent display device 100.

The guide information may be, for example, camera focusing range information. The guide information may be displayed according to a request of a user of the transparent display device 100. For example, the request of the user may include a request for displaying guide information for executing the information display method according to the exemplary embodiment, or request for executing the information display method.

Figure 4B:
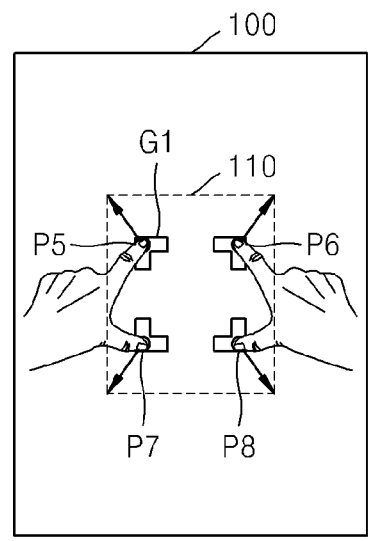

As shown in FIG. 4A, when the external device 110 is seen through the transparent display device 100, the transparent display device 100 displays guide information G1 as shown in FIG. 4B. The guide information G1 may be displayed on the transparent display device 100 according to a command of a user of the transparent display device 100. When performing the region adjusting operation of the guide information G1 toward four corners of the contour line of the external device in a state of contacting four points P5, P6, P7, and P8, as shown in FIG. 4C, the guide information, the region of which is adjusted, is displayed on the transparent display device 100.

Accordingly, the transparent display device 100 may trace the contour line of the external device 110 according to adjusted (x, y) coordinate values of the four points P5, P6, P7, and P8 of the guide information G1. The tracing of the contour line may be performed by connecting the changed (x, y) coordinate values of the points P5, P6, P7, and P8, but is not limited thereto. The changed (x, y) coordinate value of each point may be obtained by adding a variation amount according to the dragging operation to the original (x, y) coordinate value, but is not limited thereto. That is, according to two-touch operations, that is, touching the four points P5, P6, P7, and P8 of the guide information G1 and touching the points representing the desired region, the original (x, y) coordinate values of the points may be updated to the (x, y) coordinate values of the second touched points.

Figure 4C:
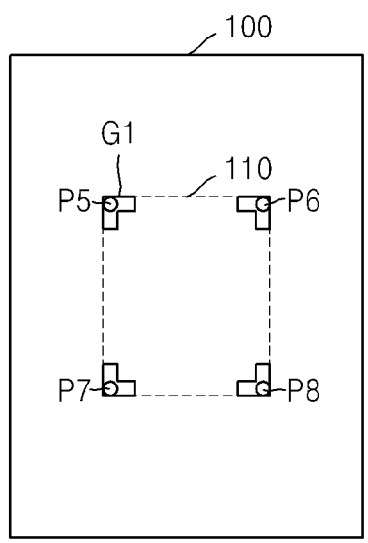
Figure 4D:
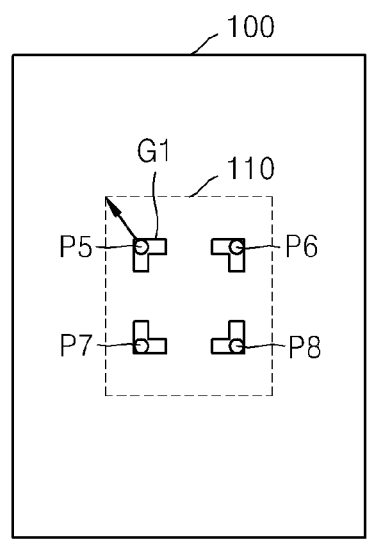
Figure 4E:
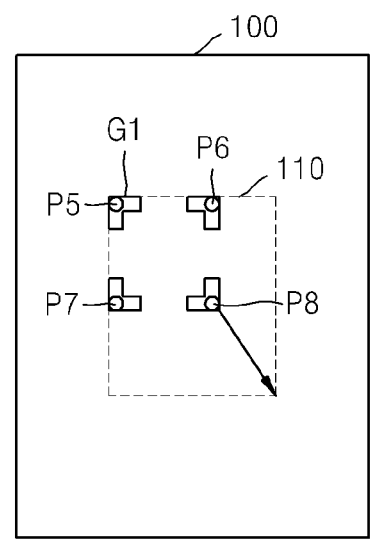

FIGS. 4D and 4E are diagrams showing examples of the region adjusting operation of the guide information G1. Referring to FIG. 4D, the user moves touched point from the left uppermost point P5 of the guide information G1 to the left uppermost point of the contour line of the external device 110 after touching the point P5. The left uppermost point in the contour line of the external device 110 is a corner of the external device 110, which corresponds to the point P5 of the guide information G1.

Next, after touching the right lowermost point P8 of the guide information G1, the touched point is dragged to the right lowermost point in the contour line of the external device 110, the region of the guide information G1 is moved from the points P6, P7, and P8 except for the left uppermost point P5, and accordingly, the display state of the guide information G1 is changed as shown in FIG. 4C.

According to the examples shown in FIGS. 4D, 4E, and 4C, after touching one point of the guide information G1, the touched point is moved to a corresponding corner of the external device 110, and then, the diagonal point of the guide information G1 is touched and dragged to the corresponding corner of the external device 110 so as to change a display location of the guide information G1 or adjust displayed size of the guide information G1.

The one point and the diagonal point in the guide information G1 are not limited to the examples shown in FIGS. 4D and 4E. For example, the point P6 of the guide information G1 is touched and dragged to the corresponding corner in the contour line of the external device 110, and then, the point P7 that is in a diagonal relation with the point P6 is touched and dragged so that the other points P5, P7, and P8 of the guide information G1 may be moved to the corresponding corners in the contour line of the external device 110.

Figure 5A:
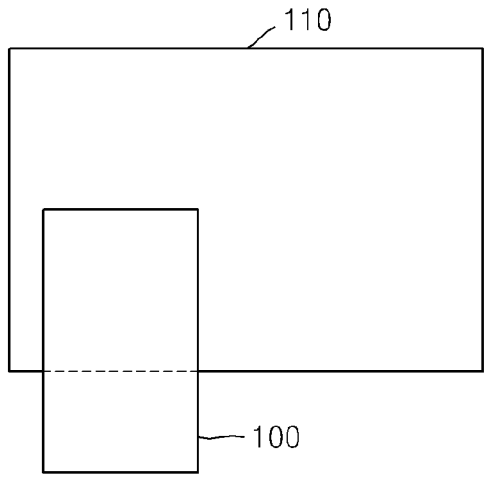
FIGS. 5A through 5E are diagrams showing other examples of a first touch input according to exemplary embodiments.
Figure 5B:
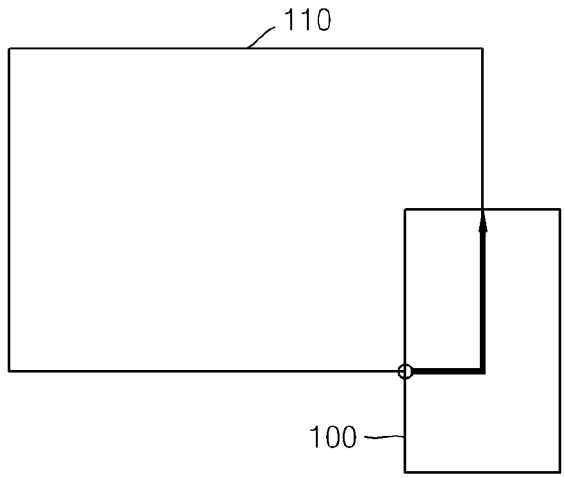
Figure 5C:
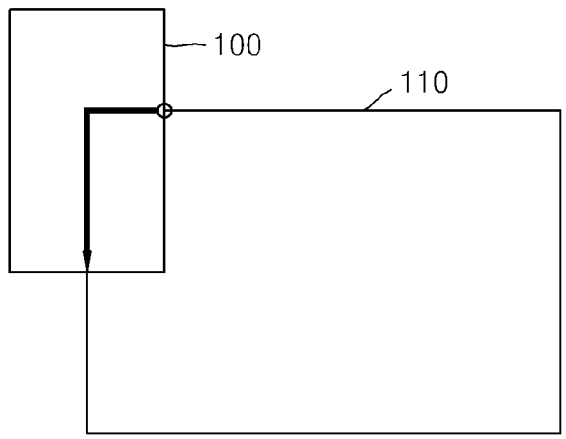
Figure 5D:
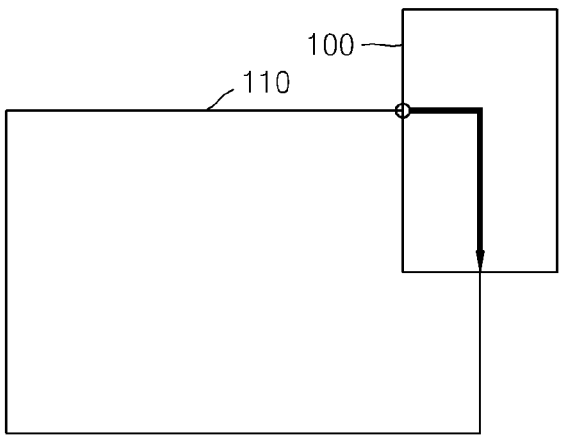
Figure 5E:
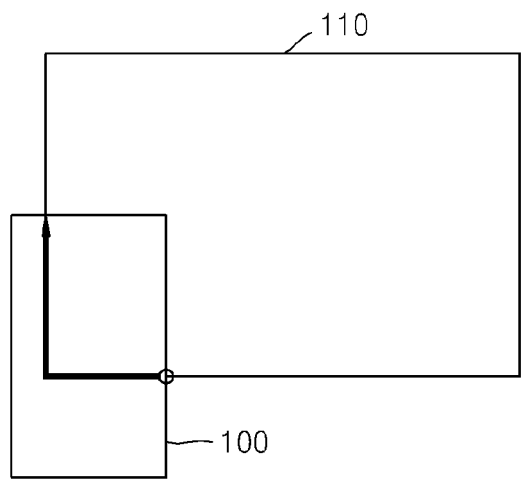

FIGS. 5A through 5E are diagrams showing examples of the first touch input in a case where the transparent display device 100 is smaller than the external device 110. That is, as shown in FIG. 5A, when the transparent display device 100 is smaller than the external device 110, the first touch input may be based on a touch operation of drawing along the contour line of the external device 110 that overlaps the transparent display device 100. Here, a direction of the touch operation, that is, drawing direction along the contour line, may not be limited to one direction.

As shown in FIG. 5A, the transparent display device 100 may be smaller than the external device 110. Accordingly, when an object to be selected is displayed at a location adjacent to a center on a screen of the external device 110 so that the first touch input shown in FIGS. 5B through 5E is not applied, the transparent display device 100 may reduce a size of the external device 110 by using a zoom-out function of a camera to receive a first touch input and a second touch input. Here, the transparent display device 100 may detect a screen size of the external device 110 according to a zoom-out magnification.

Figure 6A:
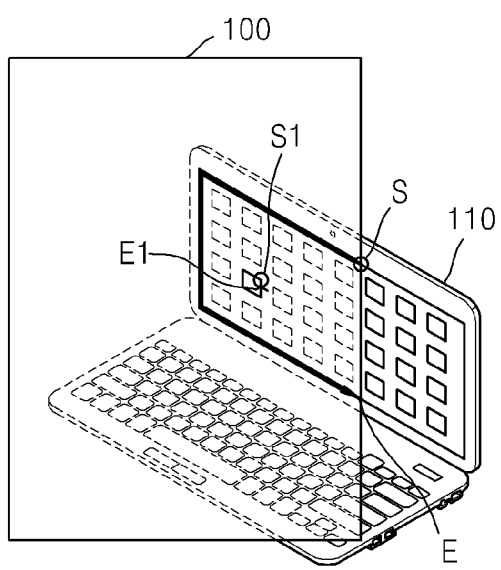
FIGS. 6A through 6C are diagrams showing a first touch input, a second touch input, and a screen displayed on a transparent display device according to the first and second touch inputs, according to exemplary embodiments.

Meanwhile, when the external device 110 is seen through the transparent display device 100 as shown in FIG. 6A, the first touch input may be received when a touch operation of touching a start point S and dragging to the end point E along the contour line of the external device 110 that is seen through the transparent display device 100.

Also, the first touch input may be based on a touch operation for selecting screen information of the external device 110, which is included in a menu 910 shown in FIG. 9B and will be described later. The screen information may include at least one of screen size information of the external device 110 and screen type information of the external device 110 as described above.

Figure 9A:
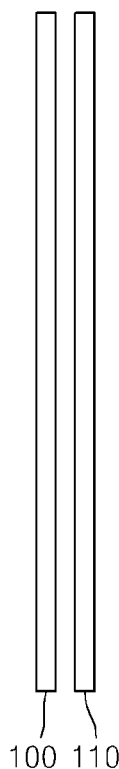
FIGS. 9A through 9C are diagrams showing screens for illustrating the first touch input and the second touch input according to the exemplary embodiments in a case where a transparent display device and an external device have equal size.
Figure 9B:
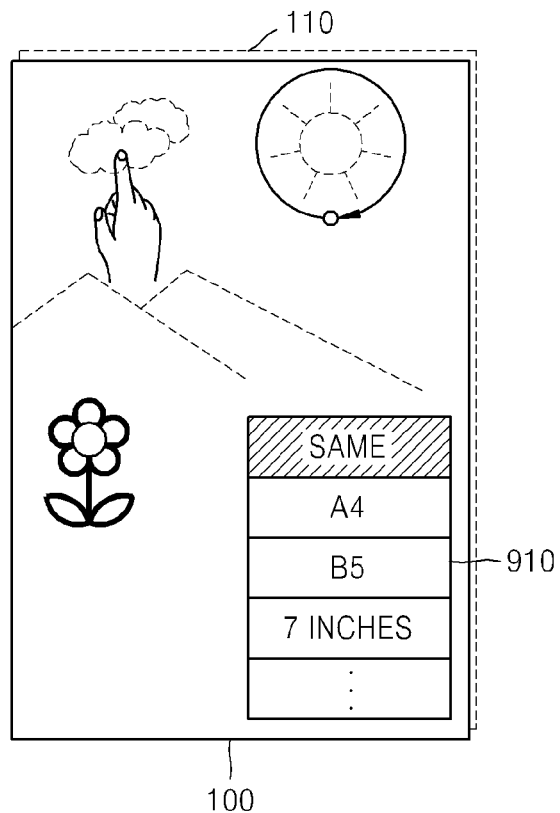

The screen size information may represent, for example, whether the screen size of the transparent display device 100 is equal to a screen size of the external device, or certain size information such as A4, B5, 7 inches, 4 inches, etc. as shown in FIG. 9B, but is not limited thereto. The first touch input may be based on a touch operation for selecting corresponding screen size from among the pieces of the screen size information.

If the screen size of the transparent display device 100 is different from the screen size of the external device 110, the transparent display device 100 may change the (x, y) coordinate information on the transparent display device 100 according to the first touch input and the (x, y) coordinate information on the transparent display device 100 according to the second touch input into information according to the screen size of the external device 110.

For example, when the transparent display device 100 has a screen size (length, width, area, etc.) of 4 inches and the external device 110 has a screen of 7 inches, the transparent display device 100 may change the coordinate information of the first touch input on the transparent display device 100 and the coordinate information of the second touch input on the transparent display device into coordinate information on the screen size of 7 inches, by using a function of converting the coordinate information of the screen size of 4 inches into coordinate information of the screen size of 7 inches. Here, the transparent display device 100 may use relational information between the (x, y) coordinate information on the transparent display device 100 according to the first touch input and the (x, y) coordinate information on the transparent display device 100 according to the second touch input (for example, difference information between the coordinate information).

Also, if the transparent display device 100 has a screen size of 10 inches and the external device 110 has a screen size of 4 inches, the transparent display device 100 may change the coordinate information of the first touch input on the transparent display device 100 and the coordinate information of the second touch input on the transparent display device 100 into coordinate information on the screen size of 4 inches, by using a function of converting the coordinate information of the 10-inch screen size into the coordinate information of 4-inch screen size.

The above described function of converting the coordinate information according to the screen size may be included in the external device 110. When the external device 110 has the function of converting the coordinate information, the transparent display device 100 may transmit the (x, y) coordinate information on the transparent display device 100 according to the first touch input, the (x, y) coordinate information on the transparent display device 100 according to the second touch input, and the screen size information of the transparent display device 100 to the external device 110.

The screen type information may include information representing whether the screen type of the external device 110 is a touch type or a non-touch type. If the screen of the external device 110 is the touch type screen, the external device 110 may recognize a region overlapping the transparent display device 100 and the external device 110. Accordingly, the first touch input may not include information relating to the contour line of the external device 110, but may only include the information representing that the screen of the external device 110 is the touch type screen.

In addition, in operation S201 of FIG. 2, the second touch input is an input for selecting at least one object displayed on the external device 110. The object that is displayed on the external device 110 is seen through the transparent display device 100. The input for selecting the at least one object displayed on the external device 110 may be referred to as an input for selecting at least one position of the screen of the external device 110.

The second touch input may be based on at least one of a touch operation, that is, touching an arbitrary point on a contour line of an object that is seen through the transparent display device 100 and dragging the touched location along the contour line of the object, and a touch operation of writing along the object (for example, text) that is seen through the transparent display device 100. The second touch input may be referred to as a touch input on the screen of the transparent display device 100 indicating position information (or second position information) of the object displayed on the screen of the external device 110. The second touch input may be referred to as an input that selects a position of the screen of the external device 110 viewable through the transparent display device 100. The object is displayed on the screen of the external device 110 at the position. The position comprises one of a coordinate position of the screen of the external device 110 viewable through the transparent display device 100 and an area of the screen of the external device 110 viewable through the transparent display device 100.

Figure 6B:
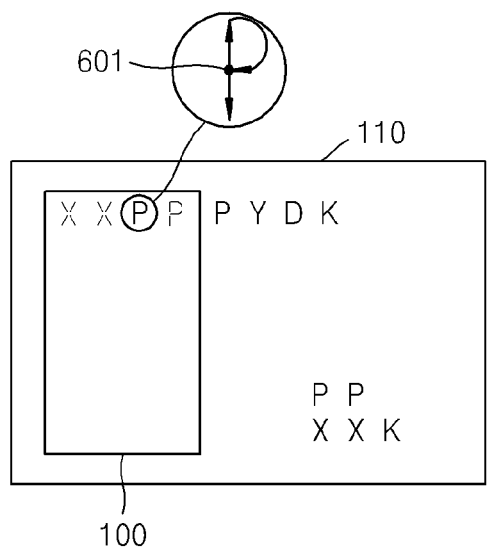
Figure 6C:
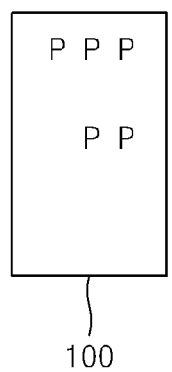

FIGS. 6A through 6C are diagrams showing examples of the second touch input according to the exemplary embodiment.

FIG. 6A shows the second touch input based on a touch operation of drawing along a contour line of an object and the first touch input based on a touch operation of drawing along the contour line of the external device 110.

That is, referring to FIG. 6A, the first touch input is received according to the touch operation of touching the point S and drawing a line to the point E along the contour line of the external device 110, and the second touch input is received according to the touch operation of drawing a line along with a contour line of an icon. The touch operation of drawing a line along the contour line of the icon is performed by touching a point S1 and drawing a line to a point E1 along the contour line of the icon that is an object, and accordingly, the second touch input is received. The start point and the end point of the touch operation for drawing along the contour line of the icon are not limited to the examples shown in FIG. 6A. That is, the start point is an arbitrary point in the contour line of the icon, and the end point is determined according to the start point as described above. In FIG. 6A, the object displayed on the external device 110 is an icon, but the object displayed on the external device 110 may be another type of object, as discussed below.

Also, the touch operation between the start point and the end point of the touch operation for drawing along the contour line of the object may be performed continuously or discontinuously. If the touch operation is performed discontinuously, the end point of the touch operation for drawing along the contour line of the object may be changed.

For example, the touch operation for drawing along the contour line of the object in FIG. 6A starts from the start point S1 and stops at a left lowermost point of the object, and then, the touch operation starts again from the start point S1 or the end point E1 to the left lowermost point of the object. In this case, the end point is the left lowermost point of the object, and the end point E1 may be a connection point for connecting the contour line according to the touch operation. The point where the touch operation stops is not limited to the above example. That is, the touch operation may be stopped at an arbitrary point on the contour line of the object, or at a plurality of points on the contour line of the object.

FIG. 6B shows an example where the second touch input is received based on a writing touch operation along the object (text). That is, FIG. 6B shows a second touch input based on the touch operation for writing an alphabet character P. As such, whereas the icon displayed on the external device 110 in FIG. 6A constituted the object, the alphabet character P is the object displayed on the external device 110 in FIG. 6B. The second touch input based on the object writing touch operation may be performed by touching an arbitrary point in the text, and then, writing along the text. For example, after touching a point 601, a writing touch operation along the object (text) may be performed in a direction denoted by an arrow of FIG. 6B. However, the start point of the object writing touch operation is not limited to the example shown in FIG. 6B, that is, an arbitrary point of the object may be the start point. In addition, the object writing touch operation may be performed continuously or discontinuously. When the object writing touch operation is performed discontinuously, at least one connection point as described above may be included between the start point and the end point.

Figure 7A:
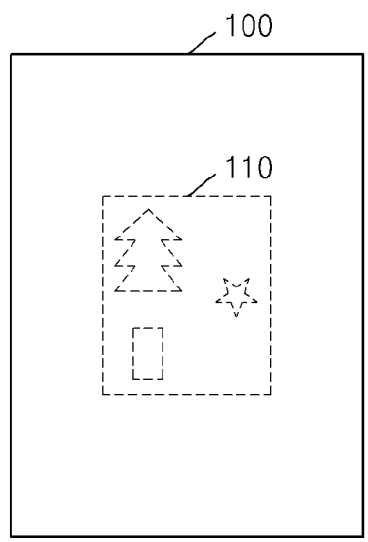
FIGS. 7A through 7D are diagrams showing screens for illustrating the first touch input, the second touch input, and editing processes according to the exemplary embodiments.
Figure 7B:
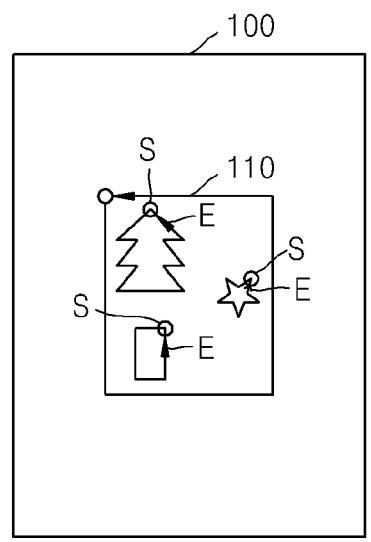

FIGS. 7A and 7B are diagrams showing examples of a screen for describing the first touch input and the second touch input, in a case where the transparent display device 100 has a screen that is larger than that of the external device 110. That is, as shown in FIG. 7A, when the external device 110 is seen through the transparent display device 100, the first touch input is based on the touch operation for drawing along the contour line of the external device 110 and the second touch input is based on the touch operation for drawing along the contour line of the object displayed on the external device 110.

FIGS. 8A through 8G are diagrams showing other examples for illustrating the first touch input and the second touch input in a case where the transparent display device 100 is smaller than the external device 110. FIGS. 8A through 8G shows examples in which pieces of an object that is displayed on the external device 110 are arranged by adjusting the overlapping locations of the transparent display device 100 and the external device 110. Therefore, in the examples shown in FIGS. 8A through 8G, the transparent display device 100 displays information of sensing the second touch input on the transparent display device 100.

Figure 8A:
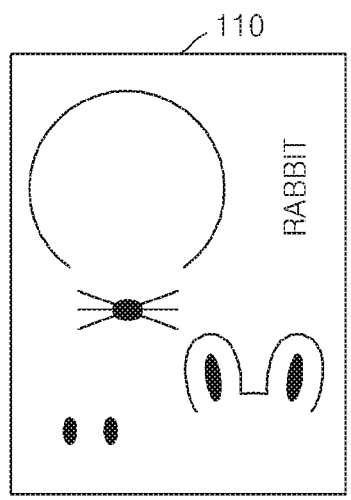
FIGS. 8A through 8G are diagrams showing screens for illustrating the first touch input and the second touch input according to the exemplary embodiments.
Figure 8B:
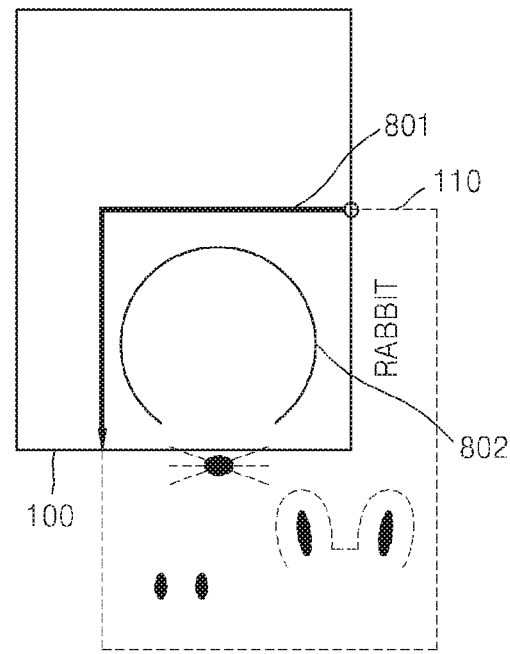

That is, when the screen displayed on the external device 110 is shown as FIG. 8A, the transparent display device 100 overlaps the external device 110 as shown in FIG. 8B. Here, the first touch input is based on a touch operation for drawing along the contour line of the external device 110 (801), and the second touch input is based on a touch operation for drawing along a contour line of the object (802). Here, information of sensing the second touch input (802) is displayed on the transparent display device 100.

The transparent display device 100 detects relational information between (x, y) coordinate information on the transparent display device 100 according to the first touch input and (x, y) coordinate information on the transparent display device 100 according to the second touch input in FIG. 8B, and stores the detected information. The relational information detected by the transparent display device 100 may include a difference between the (x, y) coordinate information on the transparent display device 100 according to the first touch input and the (x, y) coordinate information on the transparent display device 100 according to the second touch input. The external device 110 may recognize the object selected by the transparent display device 100 in FIG. 8B according to the (x, y) coordinate information according to the first touch input, the (x, y) coordinate information according to the second touch input, and the above relational information.

For example, when the coordinate information according to the first touch input (801) includes coordinates from (x(1), y(1)) to (x(1+m), y(1+m)), the coordinate information according to the second touch input (802) includes coordinates from (x(i), y(i)) to x((i+j), y(i+j)), and the number of pieces of the coordinate information obtained by the first touch input and the number of pieces of the coordinate information obtained by the second touch input are equal to each other, the transparent display device 100 may obtain relational information from coordinates (x(1)−x(i), y(1)−y(i)) to (x(1+m)−x(i+j), y(1+m)−y(i+j)). Here, m, i, and j are natural numbers that are equal to or greater than 2.

However, the number of pieces of coordinate information on the transparent display device 100 according to the first touch input and the number of pieces of coordinate information on the transparent display device 100 according to the second touch input may be different from each other. In this case, the transparent display device 100 may detect the above relational information by sampling the coordinate information obtained by the first touch input and the coordinate information obtained by the second touch input. A target to be sampled may be determined according to the display location thereof.

Figure 8C:
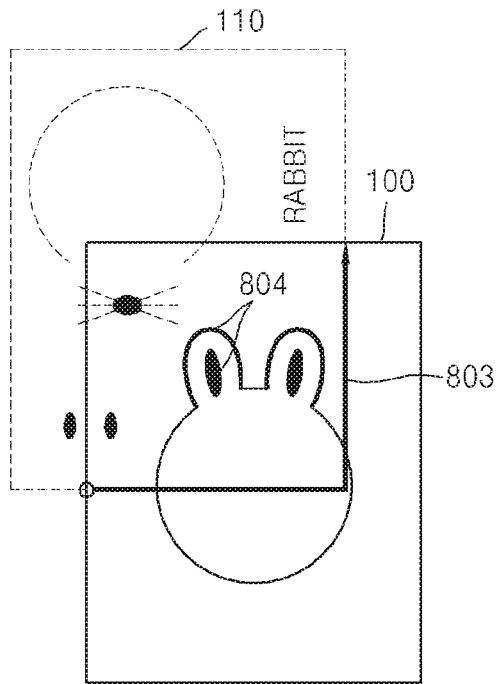

Next, as shown in FIG. 8C, when the transparent display device 100 overlaps the external device 110, the first touch input is based on a touch operation for drawing along the contour line of the external device 110 (803) and the second touch input is based on a touch operation for drawing along the contour line of the object (804). Here, information of sensing the second touch input (804) is displayed on the transparent display device 100.

Accordingly, the image of the object displayed on the transparent display device 100 may include the information of sensing the second touch input (802) in FIG. 8B, as shown in FIG. 8C. The transparent display device 100 detects the coordinate information according to the first touch input and the second touch input and the relational information between the coordinate information in FIG. 8C and stores the detected information as described with reference to FIG. 8B. Here, the transparent display device 100 stores the coordinate information and the relational information between the coordinate information detected in the process of FIG. 8B and the coordinate information and the relational information between the coordinate information detected in the process of FIG. 8C to be distinguished that the coordinated information and the relational information are detected from each other process.

Figure 8D:
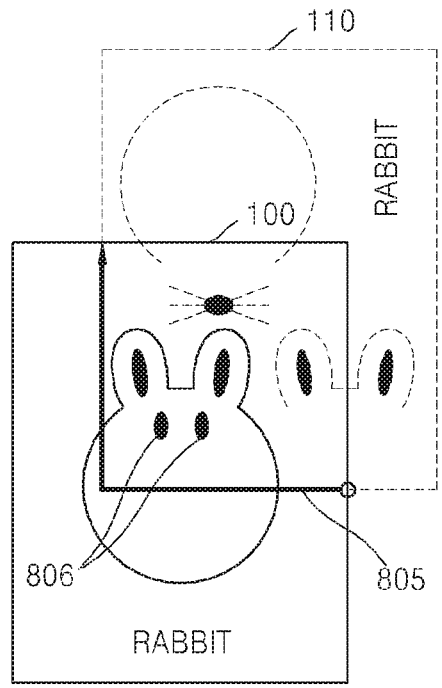

As shown in FIG. 8D, when the transparent display device 100 overlaps the external device 110, the first touch input is based on a touch operation for drawing along the contour line of the external device 110 (805) and the second touch input is based on a touch operation for drawing along the contour line of the object (806). Here, the second touch input may further include a touch operation for filling inside the contour line of the object. Information of sensing the second touch input (806) is displayed on the transparent display device 100. Accordingly, the image of the object displayed on the transparent display device 100 may include an image including the information of sensing the second touch input in the processes shown in FIGS. 8B and 8C.

The transparent display device 100 detects and stores the coordinate information on the transparent display device 100 according to the first touch input and the second touch input in the process shown in FIG. 8D and the relational information between the coordinate information, as described with reference to FIG. 8B. When storing the information, the transparent display device 100 stores the detected coordinate information and the relational information to be distinguished from the coordinate information and the relational information obtained in the processes shown in FIGS. 8B and 8C.

Figure 8E:
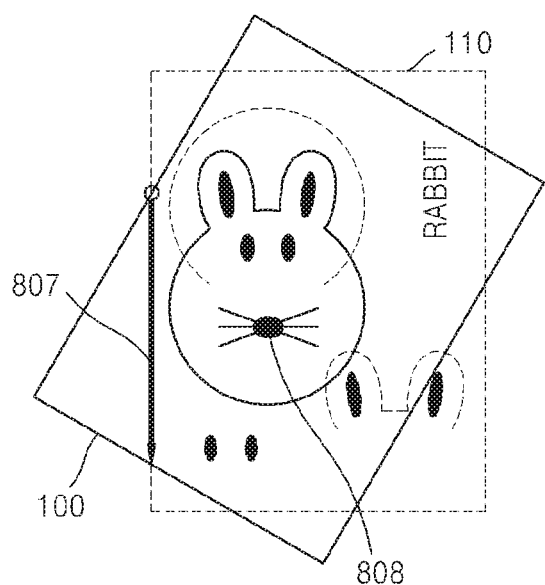

As shown in FIG. 8E, when the transparent display device 100 overlaps the external device 110, the first touch input is based on a touch operation for drawing along the contour line of the external device 110 (807), and the second touch input is based on a touch operation for drawing along the contour line of the object (808). Here, the second touch input may further include a touch operation for filling inside the contour line of the object. Information of sensing the second touch input (808) is displayed on the transparent display device 100. Accordingly, the image of the object displayed on the transparent display device 100 may be the image including all the information of sensing the second touch input in processes shown in FIGS. 8B, 8C, and 8D.

The transparent display device 100 obtains coordinate information on the transparent display device 100 according to the first touch input (807) and the second touch input (808) in FIG. 8E and the relational information between the coordinate information, and stores the detected information. Here, the transparent display device 100 stores the detected coordinate information and the relational information obtained in the process of FIG. 8E to be distinguished from the coordinate information and the relational information obtained in the processes shown in FIGS. 8B through 8D.

Figure 8F:
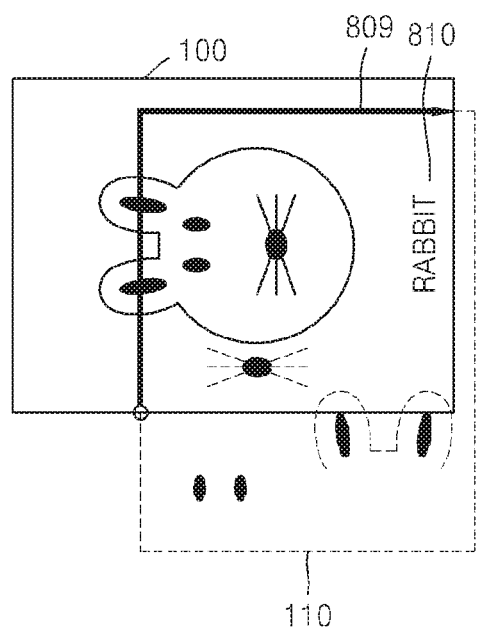

When the transparent display device 100 and the external device 110 overlap each other as shown in FIG. 8F, the first touch input is based on a touch operation for drawing along the contour line of the external device 110 (809) and the second touch input is based on a touch operation for writing along a text "RABBIT" (810). Here, information of sensing the second touch input (810) is displayed on the transparent display device 100. Accordingly, the image of the object displayed on the transparent display device 100 is an image including all the information of sensing the second touch inputs in the processes shown in FIGS. 8B through 8E. The transparent display device 100 obtains coordinate information on the transparent display device 100 according to the first touch input and the second touch input in FIG. 8F and the relational information between the coordinate information, and stores the detected information as shown in FIGS. 8B through 8E.

Figure 8G:
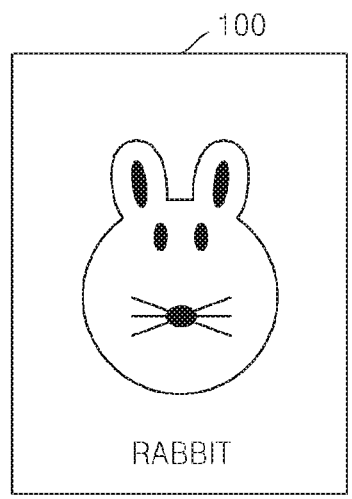

According to displaying information of sensing the second touch inputs in the processes shown in FIGS. 8B through 8F on the transparent display device 100, the information of sensing the second touch inputs is displayed on the transparent display device 100 as shown in FIG. 8G. As described above, by displaying the information of sensing the second touch inputs on the transparent display device 100 when the second touch input is received, a displaying location about the object, which would be transmitted from the external device 110, may be determined in advance.

Also, the processes shown in FIGS. 8B through 8F may be performed after changing a location of the transparent display device 100 or moving the transparent display device 100 to arrange pieces of the object displayed on the external device 110. Therefore, the transparent display device 100 may clearly distinguish the first touch input and the second touch input from each other in each screen. For example, after receiving the first touch input and the second touch input in FIG. 8B, the transparent display device 100 changes its location or moves, and then, receives the first touch input and the second touch input according to the process of FIG. 8C to select the object displayed on the external device 110 as shown in FIG. 8C. Therefore, the first and second touch inputs in the process of FIG. 8B and the first and second touch inputs in the process of FIG. 8C may be distinguished from each other via sensing of the location variation or the moving of the transparent display device 100.

Figure 9C:
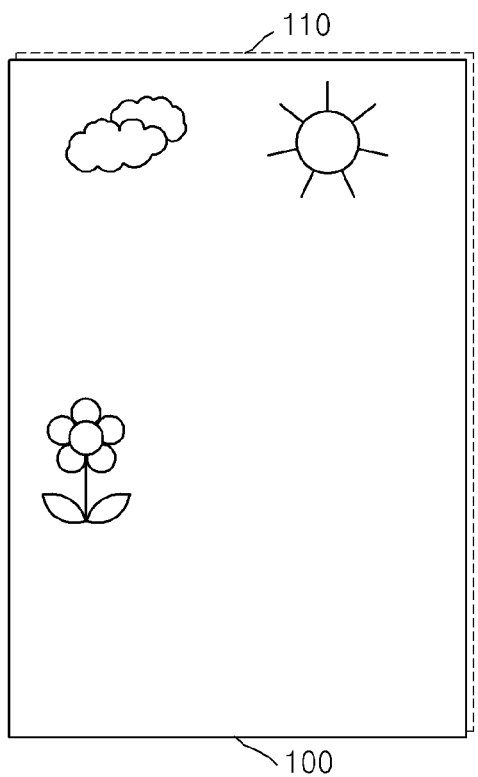

FIGS. 9A through 9C are diagrams showing examples of screen for describing the first and second touch inputs.

Referring to FIG. 9A, the transparent display device 100 and the external device 110 have the same size. Referring to FIG. 9B, a first touch input operation is performed based on a menu 910 displayed on the transparent display device 100, and a second touch input is based on a touch operation for setting a closed region with respect to a sun, a tap-based touch operation with respect to a cloud, and a touch operation for drawing a contour line of a flower. The closed region shown in FIG. 9B is not limited thereto. For example, the closed region may be set as various types of closed loops in the transparent display device 100.

FIGS. 10A through 10D are diagrams showing examples of the screens for describing a first touch input and a second touch input based on an augmented reality service.

Figure 10A:
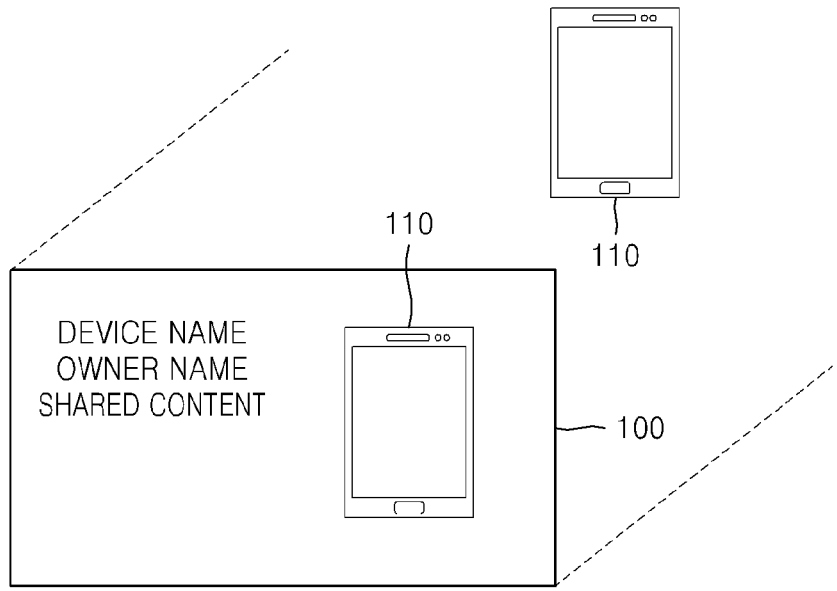
FIGS. 10A through 10D are diagrams showing examples of the first touch input and the second touch input according to the exemplary embodiments.

FIG. 10A shows a case where information about the external device 110 based on the augmented reality service is displayed adjacent to the external device 110 that is seen through the transparent display device 100. The information about the external device 110 based on the augmented reality service may be provided from the external device 110, another external device, or a server based on a physical locations between the transparent display device 100 and the external device 110.

The information about the external device 110 based on the augmented reality service may be provided using an access point. When the transparent display device 100 and the external device 110 are located within a communication area of the same access point, physical locations of the transparent display device 100 and the external device 110 may be estimated by using an indoor sensor capable of estimating a physical location of a device such as a geomagnetic sensor, an acceleration sensor, a gyro sensor, and an altitude sensor mounted in the device. Thus, the information about the external device 110 based on the augmented reality service may be provided from the above described other external device or the server according to the estimated physical locations.

Otherwise, the transparent display device 100 receives or reads, from the external device 110, information that is necessary for receiving information based on the augmented reality service about the external device 110 (for example, mark information for recognizing the external device 110) using short distance communication such as NFC, and then, collects and displays the information based on the augmented reality service about the external device 110 from the server or the above described other external device.

The information about the external device 110 seen through the transparent display device 100 based on the augmented reality service may include a name of the device, a name of the owner, and contents of the external device, which may be shared with other devices, as shown in FIG. 10A, but is not limited thereto.

Figure 10B:
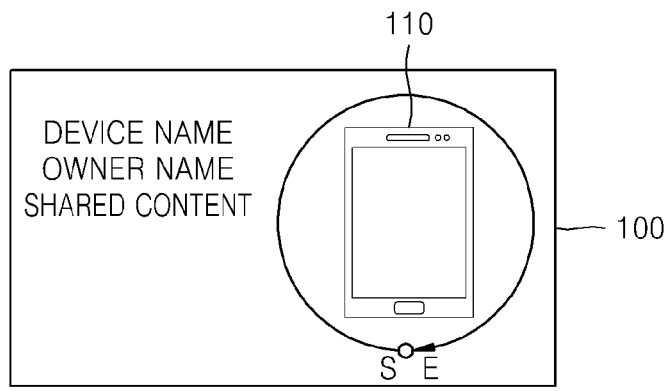

When displaying the information about the external device 110 based on the augmented reality service as shown in FIG. 10A, the first touch input may be based on an operation of setting a touch-based closed region about the external device 110 as shown in FIG. 10B. The touch-based closed region is not limited to the example shown in FIG. 10B.

Figure 10C:
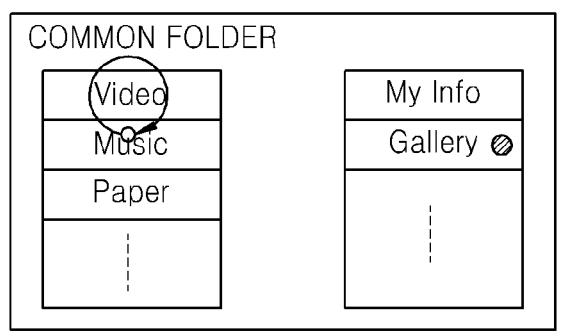

According to receipt of the first touch input, information about a shared folder may be displayed on the transparent display device 100 as shown in FIG. 10C. The information about the shared folder may be information based on the augmented reality service, or information that is received from the external device 110 when the first touch input is transmitted to the external device 110. Here, the screen displayed on the external device 110 may not display the information about the shared folder.

Figure 10D:
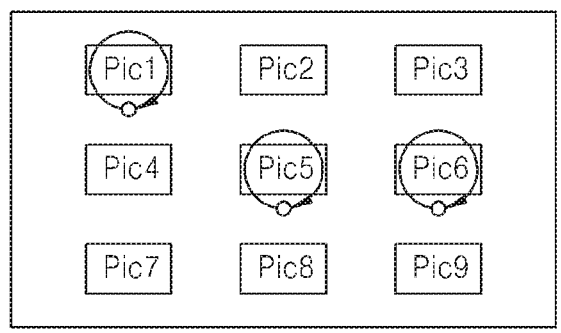

When the second touch input according to the operation of setting the touch-based closed region or tap-based touch operation on a desired folder is received based on the information about the shared folder displayed on the transparent display device 100 as shown in FIG. 10C, available pictures may be displayed as shown in FIG. 10D. The screen of the external device 110 may not display the available pictures shown in FIG. 10D.

The transparent display device 100 may perform the second touch input operation by an operation of setting a touch-based closed region on a desired picture from among the available pictures shown in FIG. 10D.

Meanwhile, in operation S202 of FIG. 2, the transparent display device 100 requests the external device 110 for information about at least one selected object, based on the first and second touch inputs. A signal requesting the information about the object may include the coordinate information on the transparent display device 100 according to the first and second touch inputs and/or relational information between the coordinate information.

Otherwise, the signal requesting the information related to the object may include coordinate information on the external device 110 according to the first and second touch inputs, wherein the coordinate information is converted by using the coordinate information converting function of the transparent display device 100, and/or relational information between the coordinate information. The coordinate information on the external device 110 according to the second touch input may be coordinate information of the object that is displayed on the external device 110.

The signal requesting the information related to the object may further include a signal requesting relation information with the object. The signal requesting relation information with the object may include, for example, information for requesting a folder and objects included in the folder, when the object selected according to the second touch input is the folder. The objects included in the folder may be referred to as objects that are not displayed on the external device 110.

The signal requesting the information related to the object may include coordinate information on the transparent display device 100 according to the first and second touch inputs, and screen size information of the transparent display device 100. In this case, the external device 110 may detect coordinate information on the external device 110 according to the first and second inputs based on the information transmitted from the transparent display device 100 and the screen information of the external device 110. The coordinate information on the external device 110 may be detected by the processes described with reference to FIGS. 8B through 8F, but is not limited thereto.

The signal requesting the information related to the object may include various pieces of information that may be estimated by the examples of the first and second touch inputs described with reference to FIGS. 3 through 10D.

In operation S203, the transparent display device 100 receives information related to the selected object from the external device 110, and in operation S204, the transparent display device 100 displays the received information related to the object on the transparent display device 100.

The information related to the object may include at least one other object having the same display type as that of the object selected by the second touch input. The other object has a different display location on the external device 110 from that of the selected object. That is, as shown in FIG. 6B, when the second touch input is received based on the touch operation for writing the text P, the transparent display device 100 may receive all of the text Ps that are displayed at different locations on the external device 110 from the external device 110, and displays the received text.

Here, the display locations of the received information on the transparent display device 100 may similarly correspond to the display locations on the external device 110. If there are a plurality pieces of received information, the transparent display device 100 receives information about display coordinates on the external device 110, detects information about display coordinates on the transparent display device 100 by using the screen size information of the transparent display device 100 and the display coordinate information transmitted from the external device 110, and displays the plurality of objects by using the detected coordinate information. The coordinate information may be detected by the coordinate information converting operation that is described above.

However, the external device 110 may detect information about coordinates on the transparent display device 100 by using the screen size information of the transparent display device 100 and the information about the display coordinates of the plurality pieces of the object information on the external device 110, and may transmit the detected coordinate information and the object information to the transparent display device 100. Then, the transparent display device 100 may display the objects based on the received coordinate information.

In operation S203, the information about the selected object transmitted from the external device 110 may include information relating to the selected object. The information relating to the object may include information that is not displayed on the external device 110 (for example, information about objects included in a folder) as described above.

Figure 7C:
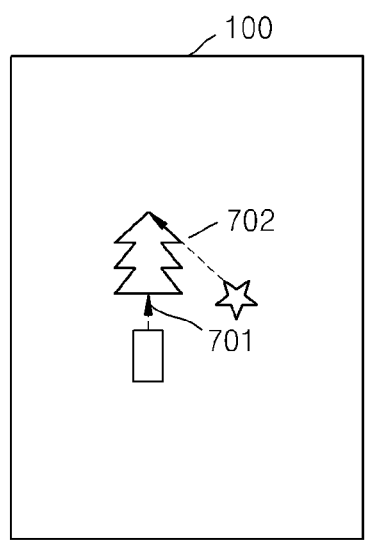

In operation S204, displaying the received information on the transparent display device 100 may include displaying the received information at similar locations as those of the external device 110 as shown in FIGS. 6C, 7C, and 9C. However, when the second touch input is received as shown in FIG. 10D, pictures Pic1, Pic5, and Pic6, which are the selected objects, are received. Thus, the transparent display device 100 may display the received pictures Pic1, Pic5, and Pic6 sequentially or on locations based on the screen shown in FIG. 10D. The received information may be stored in a clip board in the transparent display device 100, or may be displayed on a clip board after generating the clip board.

Figure 11:
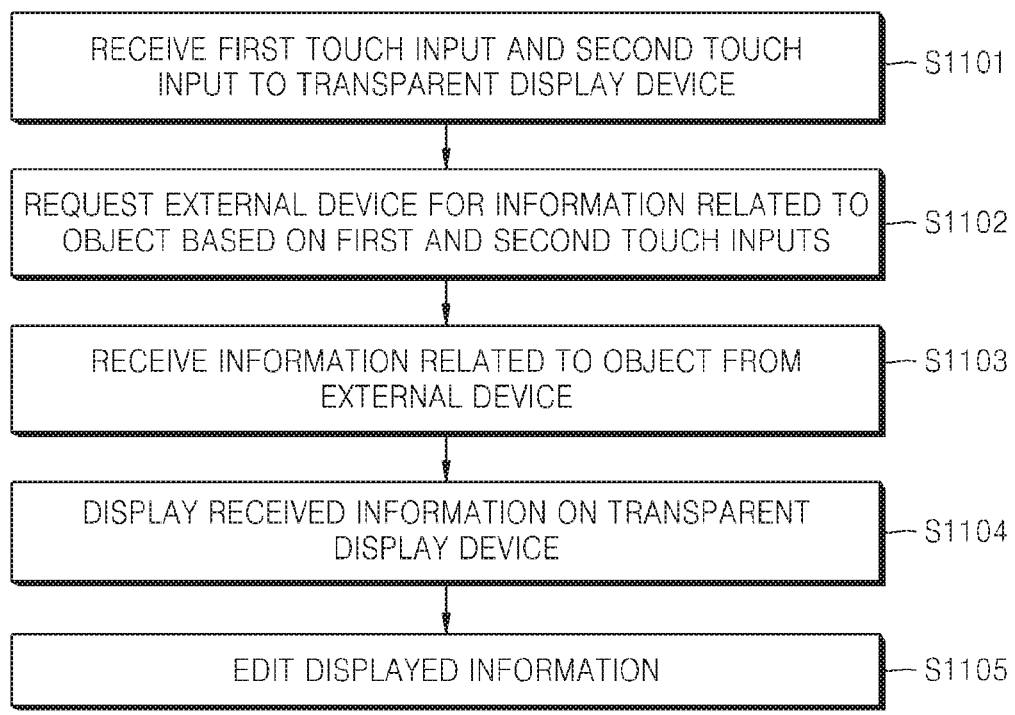
FIG. 11 is a flowchart illustrating a method of displaying information to be performed by a transparent display device, according to another exemplary embodiment.

FIG. 11 is a flowchart illustrating a method of displaying information in a transparent display device according to another exemplary embodiment. The method illustrated in FIG. 11 includes an editing function.

In operation S1101, the transparent display device 100 receives a first touch input and a second touch input. The first and second touch inputs are the same as those described with reference to FIGS. 2 through 10.

In operation S1102, the transparent display device 100 requests the external device 110 for information related to an object based on the first and second touch inputs. The request for the information related to the object is the same as that described in operation S201 of FIG. 2.

In operation S1103, the transparent display device 100 receives information corresponding to the request from the external device 110. The information related to the object that is received is the same as that described in operation S203.

In operation S1104, the transparent display device 100 displays the received information the transparent display device 100.

In operation S1105, the transparent display device 100 edits the received information that is displayed on the transparent display device 100 according to a user input.

Figure 7D:
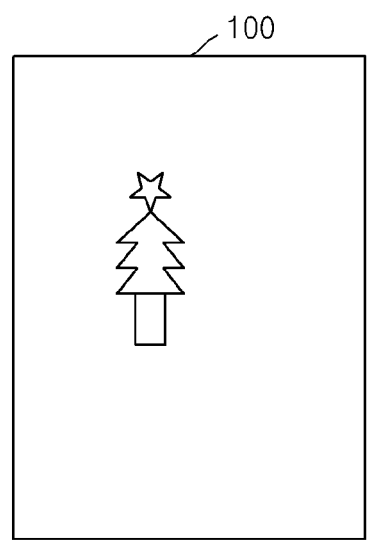

That is, when the received object is displayed on the transparent display device 100 as shown in FIG. 7C and a touch-based user input for combining the objects (701 and 702) is received, the transparent display device 100 displays a screen on which the objects are combined as shown in FIG. 7D.

The user inputs 701 and 702 may be received via various touch-based operations. For example, the user inputs 701 and 702 may be performed as various touch-based operations, for example, a touch-based operation for long-touching the object to be moved and dragging the object to a desired location of the object to be combined, a touch-based operation for long touching the object to be moved and long-touching the desired location of the object to be combined, a touch-based operation for setting a touch-based closed region on the object to be moved and long-touching the desired location of the object to be combined, or a touch-based operation for setting a touch-based closed region on the object to be moved, setting a touch-based closed region on the desired location of the object to be combined, and connecting the closed regions.

The editing operation in operation S1105 is not limited to the combination of the objects as shown in FIGS. 7C and 7D. The editing may include various edits on the object, such as change in the shape of the object or change in the content of the object, and an edit on the screen including the object.

The transparent display device 100 may perform the above editing operation based on an interaction with the external device 110. Accordingly, the information displayed on the external device 110 may reflect the editing result in the transparent display device 100 in real-time. The editing result may be stored in the external device 110 only, in the transparent display device 100 only, or in both the devices 100 and 110, according to the user input in the transparent display device 100.

Figure 12:
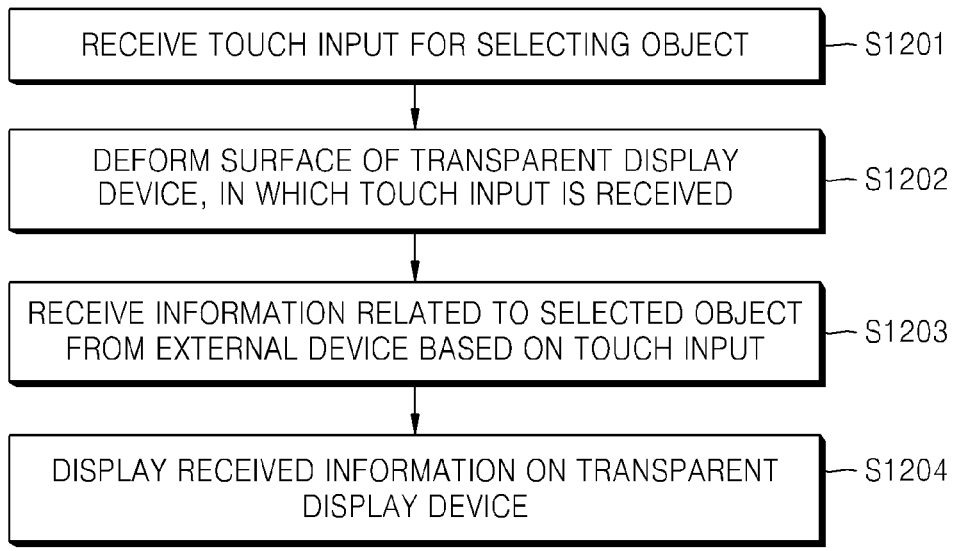
FIG. 12 is a flowchart illustrating a method of displaying information to be performed by a transparent display device, according to another exemplary embodiment.

FIG. 12 is a flowchart illustrating a method of displaying information in a transparent display device according to another exemplary embodiment. In FIG. 12, the transparent display device 100 is flexible, and a front portion and a rear portion of the transparent display device 100 may be transformed or deformed according to a touch-based input. The external device 110 has a touch screen.

In operation S1201, a touch input for selecting an object displayed on the external device 110 that is seen through the transparent display device 100 is received. Here, the received touch input may correspond to the second touch input described with reference to FIGS. 2 through 10.

In operation S1202, front and rear surface portions of the transparent display device 100 to which the touch input is received are deformed to protrude toward the external device 110.

Figure 13A:
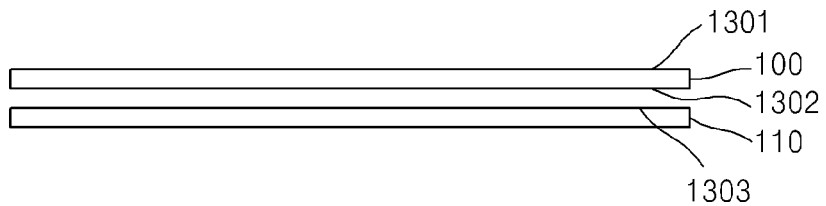
FIGS. 13A and 13B are side views of the transparent display device and the external device shown in FIG. 12.
Figure 13B:
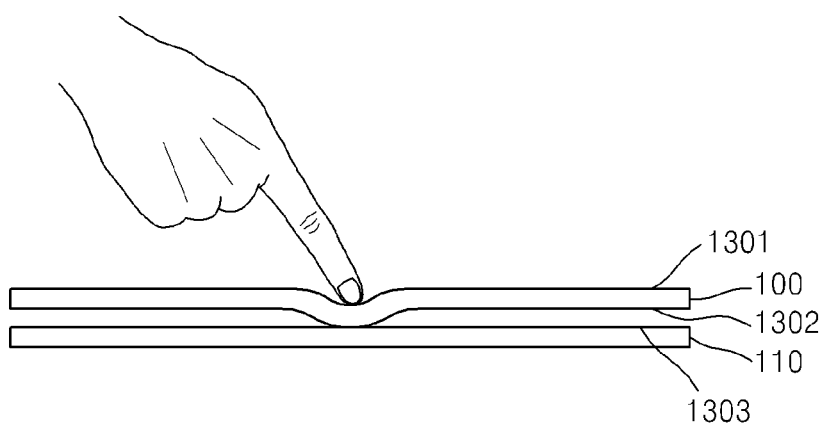

FIGS. 13A and 13B are side views showing a relation between the transparent display device 100 that is flexible and has the front and rear surface portions 1301 and 1302 that are deformed together according to the touch-based input, and the external device 110.

FIG. 13A is a side view showing the transparent display device 100 and the external device 110 overlapping each other before the touch input is received.

FIG. 13B shows a case where the front and rear surface portions 1301 and 1302 of the transparent display device 100 are transformed together to touch a touch screen 1303 of the external device 110 according to the touch-based user input to the front surface portion 1301 of the transparent display device 100. The rear surface portion 1302 of the transparent display device 100 may be configured as a constant voltage type so that the touch screen of the external device 110 may recognize a contact portion of the rear surface portion 1302 of the transparent display device 100 as a touch-based input; however, the present invention is not limited thereto. That is, the rear surface portion 1302 may be configured according to a touch sensing type of the touch screen 1303 in the external device 110.

Meanwhile, in operation S1203, the transparent display device 100 receives information related to the selected object from the external device 110 based on the touch input due to the contact between the rear surface portion 1302 of the transparent display device 100 and the external device 110.

In operation S1204, the transparent display device 100 displays the received information.

Figure 14:
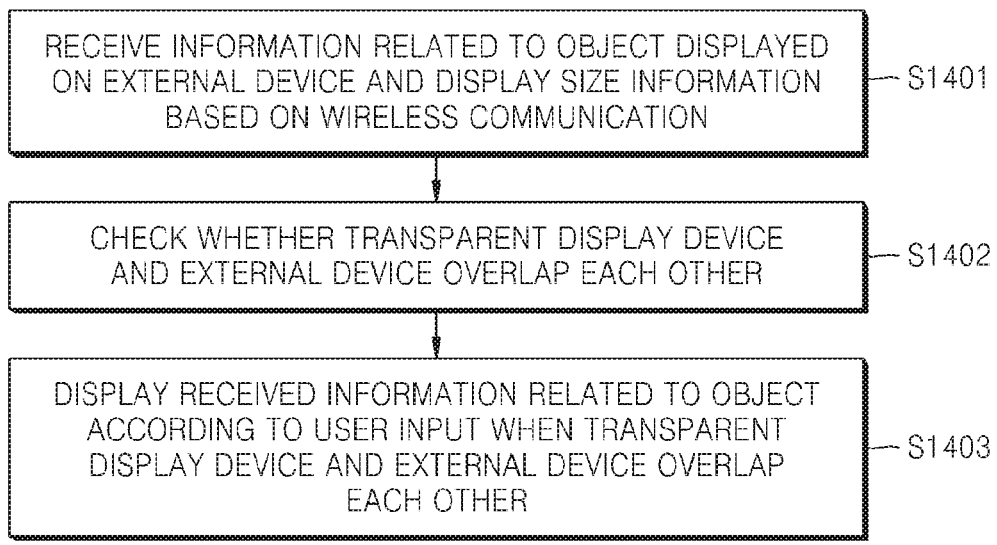
FIG. 14 is a flowchart illustrating a method of displaying information to be performed by a transparent display device, according to another exemplary embodiment.

FIG. 14 is a flowchart illustrating a method of displaying information in a transparent display device 100 according to another exemplary embodiment. FIG. 14 shows a case where the information related to the object displayed on the external device 110 and the screen size information are transmitted based on a local area wireless communication between the transparent display device 100 and the external device 110.

In operation S1401, the transparent display device 100 receives the information related to the object displayed on the external device 110 and the screen size information of the external device 110 via the local area wireless network. The local area wireless communication may include NFC, Bluetooth communication, Wi-Fi direct communication and IR association communication, but is not limited thereto.

In operation S1402, the transparent display device 100 checks whether the transparent display device 100 overlaps the external device 110. The checking in the operation S1402 may including checking the intention of the user to display the object displayed on the external device 110 that is seen through the transparent display device 100 on the transparent display device 100 according to the touch input to the transparent display device 100. The intention of the user may be interpreted as the intention to select an object to be displayed on the transparent display device 100.

The checking operation may be performed by disposing a contact sensor on the rear surface portion of the transparent display device 100 or transmitting a sensing result sensed by a contact sensor disposed on a front surface portion of the external device 110 to the transparent display device 100 via the local area wireless communication, but is not limited thereto.

Also, in the operation S1402, the transparent display device 100 and the external device 110 may overlap so that the external device 110 may be included within the screen of the transparent display device 100 when the external device 110 is smaller as shown in FIG. 3A, but is not limited thereto. If the transparent display device 100 is smaller than the external device 110 as shown in the example of FIG. 4A, a part of the external device 110 may overlap the transparent display device 100, but is not limited thereto. When the transparent display device 100 and the external device 110 have equal sizes as shown in FIG. 9A, the overlapping surfaces of the transparent display device 100 and the external device 110 may be the same as each other.

In operation S1402, if it is determined that the transparent display device 100 and the external device 110 overlap each other, the transparent display device 100 displays the information related to the object displayed on the external device 110 by using the information transmitted via the local area wireless communication according to the user input in operation S1403. The user input in the operation S1403 may include a request for displaying the object displayed on the external device 110 that is seen through the transparent display device 100, but is not limited thereto.

Figure 15:
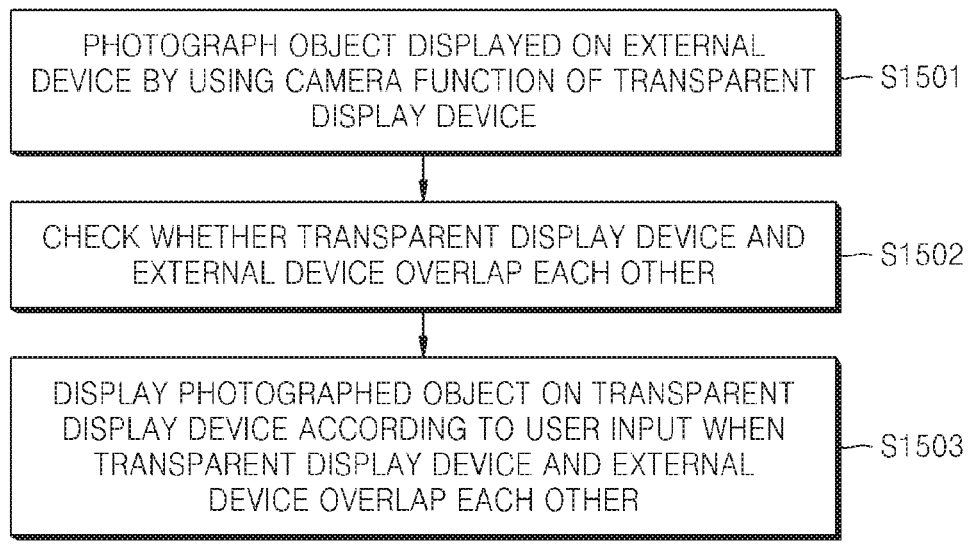
FIG. 15 is a flowchart illustrating a method of displaying information to be performed by a transparent display device, according to another exemplary embodiment.

FIG. 15 is a flowchart illustrating a method of displaying information in a transparent display device according to another exemplary embodiment. FIG. 15 shows a case where information obtained by photographing the external device 110 using a camera function of the transparent display device 100 is displayed on the transparent display device 100 according to a user input.

In operation S1501, the transparent display device 100 photographs an object displayed on the external device 110 by using the camera function.

In operation S1502, the transparent display device 100 determines whether the transparent display device 100 and the external device 110 overlap each other. Determining whether the transparent display device 100 and the external device 110 overlap each other may be performed in the same manner as that of operation S1402 described above.

In operation S1503, if it is determined that the transparent display device 100 and the external device 110 overlap each other, the transparent display device 100 displays the object displayed on the external device 110 that is photographed according to the user input. The user input may include a request for outputting the object displayed on the photographed external device 110, but is not limited thereto.

Figure 16:
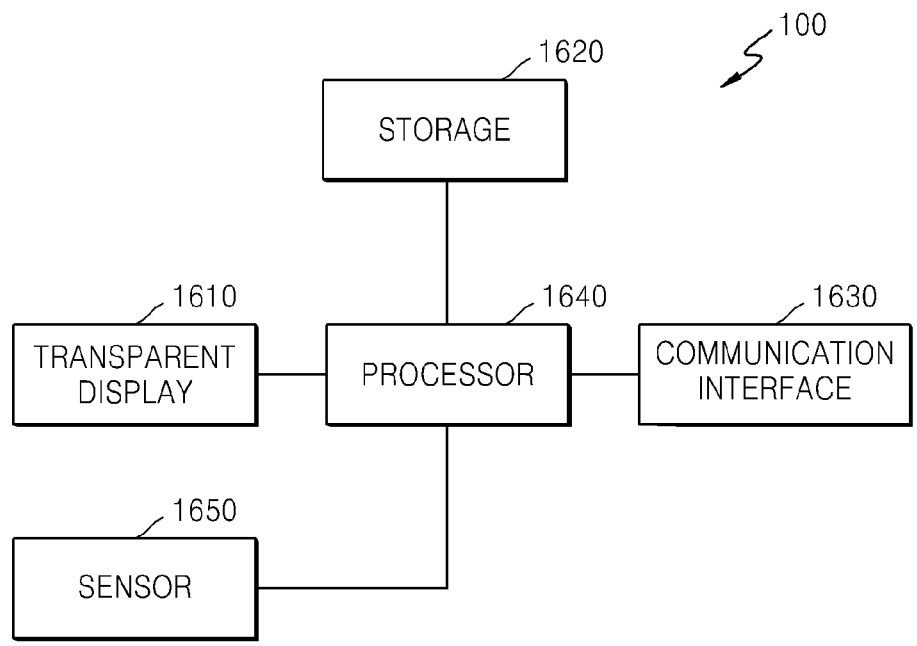
FIG. 16 is a functional block diagram of a transparent display device according to an exemplary embodiment.

FIG. 16 is a functional block diagram of the transparent display device 100 according to an exemplary embodiment.

Referring to FIG. 16, the transparent display device 100 may include a transparent display 1610, a storage 1620, a communication interface 1630, a processor 1640, and a sensor 1650. However, the transparent display device 100 may further include additional components other than those shown in FIG. 16. For example, the transparent display device 100 may include an interface, such as a universal serial bus (USB) or a camera module.

The transparent display 1610 is configured so that the object displayed on a screen of the external device 110 may be seen through the transparent display 1610 and may be configured to receive a touch-based input. The transparent display unit 1610 may be formed in various types, for example, a transparent liquid crystal display (LCD) type, a transparent thin-film electroluminescent panel (TFEL) type, a transparent OLED type, or a projection type. Hereinafter, examples of the structure of the transparent display 1610 will be described below.

The transparent LCD type is a transparent display device formed by removing a backlight unit from a currently used LCD device and using a pair of polarization plates, an optical film, a transparent thin film transistor (TFT), and a transparent electrode. The transparent display device may be referred to as a transparent display. In case of the transparent LCD device, a transmittance is degraded due to the polarization plates and the optical film and optical efficiency is reduced since peripheral light is used instead of the backlight unit; however, a large size transparent display may be realized.

The transparent TFEL type is a transparent display device using an alternating current (AC) type inorganic thin film EL display (AC-TFEL) including a transparent electrode, an inorganic phosphor, and an insulating film. The AC-TFEL emits light when accelerated electrons pass through the inorganic phosphor to excite the phosphor. If the transparent display unit 1610 is the transparent TFEL type, the processor 1640 may adjust the electrons to be projected to an appropriate location to determine a location displaying the information. Since the inorganic phosphor and the insulating film are transparent, the transparent display may be easily obtained.

Otherwise, the transparent OLED type is a transparent display device using an OLED that emits light by itself. Since an organic emission layer is transparent, the OLED may serve as the transparent display device provided that both electrodes are realized as transparent electrodes. In the OLED, electrons and holes are injected from both sides of the organic emission layer to be combined in the organic emission layer and emit light. The transparent OLED device may display the information by injecting the electrons and holes to desired locations.

Figure 17:
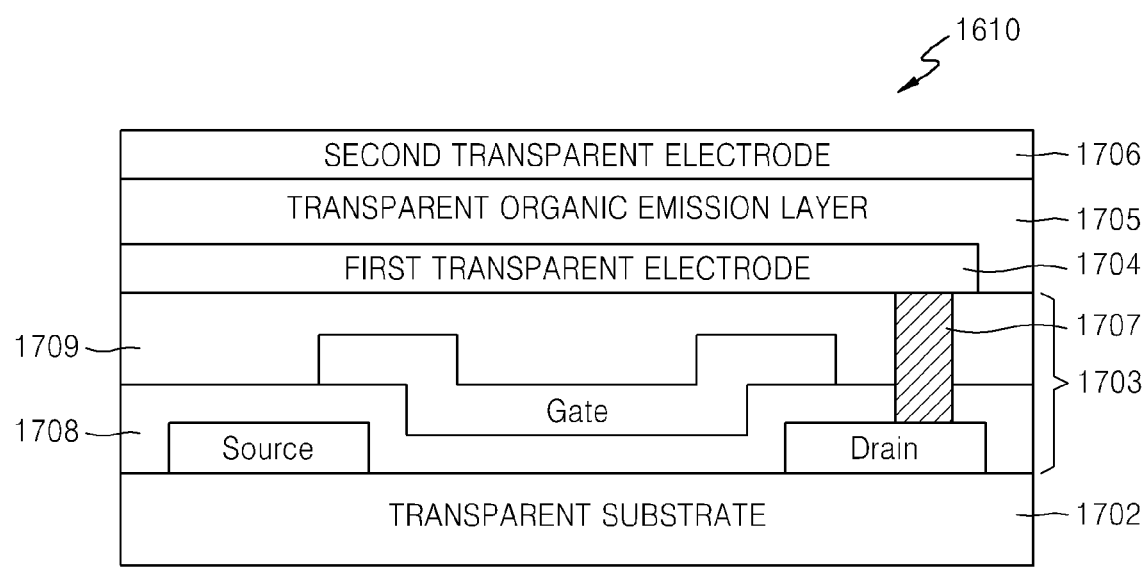
FIG. 17 is a diagram showing an example of a transparent display unit shown in FIG. 16.

FIG. 17 is a diagram showing a detailed structure of the transparent display 1610 that is formed as the transparent OLED type. However, the transparent display 1610 is not limited to the example shown in FIG. 17.

Referring to FIG. 17, the transparent display 1610 includes a transparent substrate 1702, a transparent transistor layer 1703, a first transparent electrode 1704, a transparent organic emission layer 1705, a second transparent electrode 1706, and a connection electrode 1707.

The transparent substrate 1702 may be formed of a polymer material that is transparent such as plastic, or a glass material. The material forming the transparent substrate 1702 may be determined according to environment in which the transparent display device 100 is used. For example, the polymer material is light and flexible, and thus may be applied to a portable display device. The glass material may be applied to show windows or general windows.

The transparent transistor layer 1703 is a layer including a transistor that is fabricated by replacing opaque silicon used in a conventional TFT with an organic material such as transparent zinc oxide or titanium oxide. In the transparent transistor layer 1703, a source, a gate, a drain, and various dielectric layers 1708 and 1709 are formed, and the connection electrode 1707 for electrically connecting the drain to the first transparent electrode 1704 may be formed. The transparent transistor layer 1703 includes a plurality of transparent transistors that are distributed throughout the entire display surface of the transparent display device 100. The processor 1640 applies a control signal to the gate in each of the transistors in the transparent transistor layer 1703 to drive the corresponding transparent transistor and display information.

The first transparent electrode 1704 and the second transparent electrode 1706 are disposed at opposite sides to each other while the transparent organic emission layer 1705 is interposed. The first transparent electrode 1704, the transparent organic emission layer 1705, and the second transparent electrode 1706 form an organic light-emitting diode (OLED).

The transparent OLED may be classified as a passive matrix OLED (PMOLED) and an active matrix OLED (AMOLED) according to a driving method thereof. The PMOLED has a structure in which cross points between the first and second transparent electrodes 1704 and 1706 form pixels. However, in the AMOLED, a TFT is disposed to drive each of the pixels.

Each of the first and second transparent electrodes 1704 and 1706 includes a plurality of line electrodes, arranged perpendicularly to each other. For example, if the line electrodes of the first transparent electrode 1704 are arranged in a transverse direction, the line electrodes of the second transparent electrode 1706 are arranged in a longitudinal direction. Accordingly, there are a plurality of crossing areas formed between the first and second transparent electrodes 1704 and 1706. The transparent transistor is connected to each of the crossing areas.

The processor 1640 generates a potential difference in each of the crossing areas by using the transparent transistor. The electrons and holes are induced to the transparent organic emission layer 1705 from the first and second electrodes 1704 and 1706 within the crossing area where the potential difference is generated, and then, combined with each other to emit light. On the other hand, the crossing area where the potential difference is not generated does not emit light, and accordingly, background image of the rear surface is seen as it is.

Indium tin oxide (ITO) may be used as the first and second transparent electrodes 1704 and 1706. Otherwise, a newly developed material such as graphene may be used. Graphene is a material of a honeycomb-shaped plane structure in which carbon atoms are connected to each other and having a transparent property. Otherwise, the transparent organic emission layer 1705 may be formed of various materials.

In addition, as described above, the transparent display 1610 may be formed as the projection type, as well as the transparent LCD type, the transparent TFEL type, and the transparent OLED type. The projection type is a method of displaying an image by projecting the image to a transparent screen such as a head-up display.

Also, the transparent display 1610 may be a dual-touchable touch screen, or may be a touch screen, a front surface of which is only touchable.

The transparent display 1610 displays information including the object processed in the transparent display device 100. The information may include information except for the object. The information except for the object may denote information that is displayed, but may not be selected by the user input.

The transparent display 1610 is formed as a transparent device, and a transparency of the transparent display 1610 may be adjusted by adjusting light transmittance of the transparent device or by adjusting RGB value of each pixel.

Also, the transparent display 1610 may have a structure in which an OLED and an LCD are combined. In the transparent display 1610, the OLED may be located adjacent to a front surface input portion, and the LCD may be located adjacent to a rear surface input portion. In a case where the transparent display 1610 has the above combined structure, the transparent display 1610 maintains a transparent state such as the glass during power-off status, and when power is applied, the LCD blocks the light so that the transparent display 1610 becomes opaque.

The transparent display 1610 receives a touch input of the user through the front surface input unit. The screen displayed on the transparent display 1610 may include a user interface (UI) or a graphic user interface (GUI). Also, the transparent display 1610 may receive and display the information related to the object from the external device 110 according to the touch input (the first and second touch inputs) of the user on the object displayed on the external device 110 that is seen through the transparent display unit 1610.

The storage 1620 stores at least one program that is configured to execute the information display method in the transparent display 1610. The storage unit 1620 may include a non-volatile memory such as a high speed random access memory, a magnetic disk storage device, or a flash memory, or other non-volatile semiconductor memories.

Figure 18:
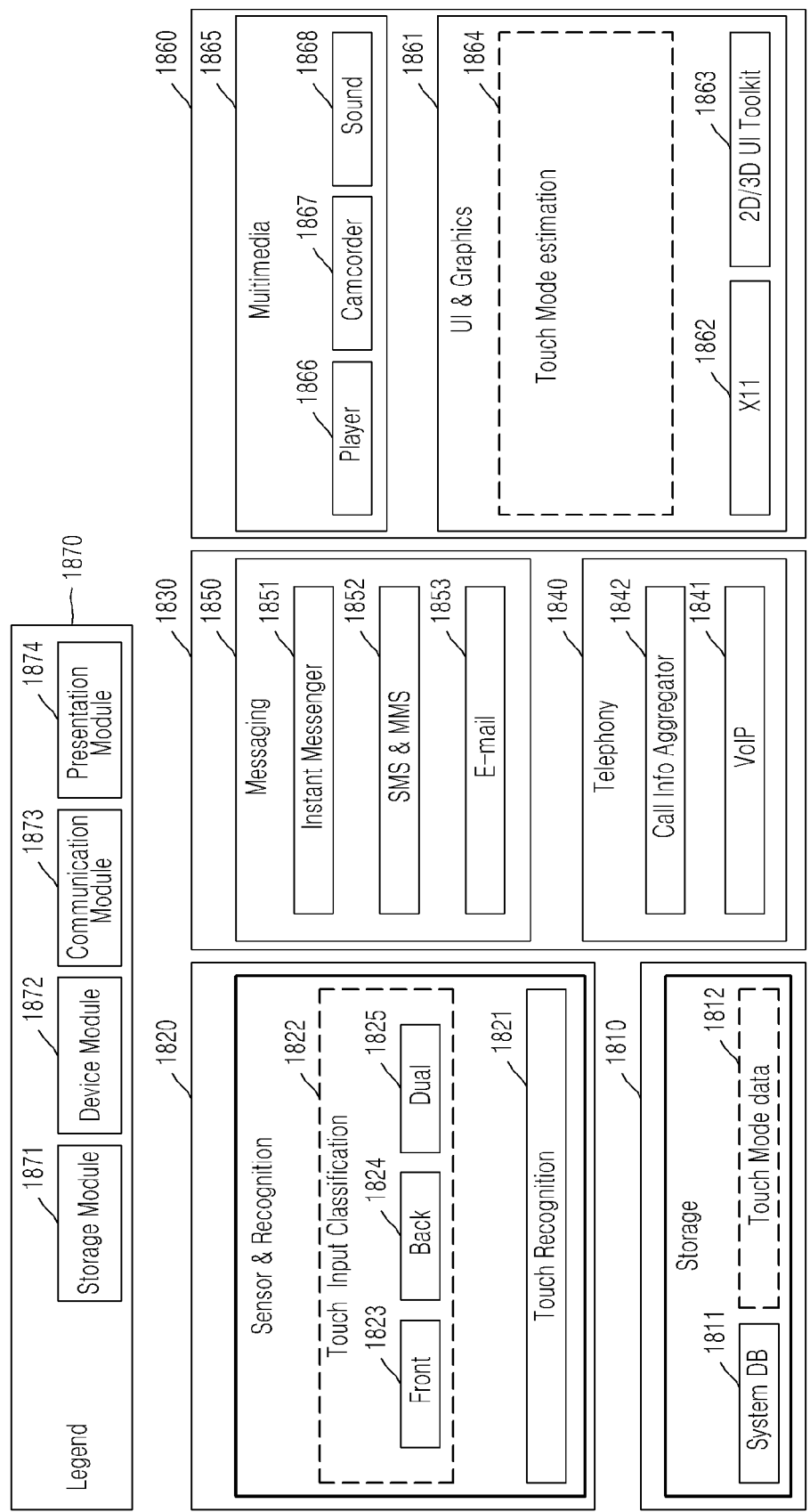
FIG. 18 is a diagram illustrating a software layer stored in a storage unit of a transparent display device, according to an exemplary embodiment.

FIG. 18 is a diagram illustrating software layers stored in the storage 1620 of the transparent display device 100 according to an exemplary embodiment.

Referring to FIG. 18, the software layer may include a storage module 1810, a sensor and recognition module 1820, a communication module 1830, an input/output module 1860, and a legend module 1870, but is not limited thereto.

The storage module 1810 includes a system database 1811 that is a storage for storing general data such as address book and environmental information, and a touch mode data region 1812 for storing setting values for touch modes of the object that will be displayed on the transparent display 1610.

The sensor recognition module 1820 includes a module 1821 for sensing a touch on the transparent display 1610, and a module 1822 for classifying the input touch. The module 1822 for classifying the input touch may classify the touch input as a front input mode 1823 for transferring an input on the front surface input interface to an event processor X11, a rear input mode 1824 for transferring an input on a rear surface input interface to the event processor X11, and a dual mode 1825 for transferring a dual-touch input (both-touch input of the front surface input interface and the real surface input interface) to the event processor X11. However, the sensor recognition module 1820 may be configured by an input mode for only transferring the input on the front surface of the transparent display 1610 to the event processor X11.

The communication module 1830 may include a telephony module 1840 and a messaging module 1850, but is not limited thereto.

The telephony module 1840 includes an information collection module 1842 for connecting a phone call, and a voice service module 1841 for transmitting voice over the Internet based on voice over Internet protocol (VoIP).

The messaging module 1850 includes an instant module 18S1 regarding conversation between users through an Internet connection, a module 1852 regarding short message service (SMS) text messages and multimedia messages, and a module 1853 for emailing.

The input/output module 1860 includes a UI & graphic module 1861, and a multimedia module 1865.

The UI & graphic module 1861 includes an X11 module 1862 for receiving a touch input by a window manager, a module 1863 that outputs all objects seen by a user on a screen, and an evaluation module 1864 regarding a mode setting value stored for each object and a current touch input.

The multimedia module 1865 includes a moving picture reproducing module 1866, a moving picture and still image capturing module 1867, and a voice reproducing module 1868.

The programs for executing the information display method according to the exemplary embodiments may be stored in the storage module 1871. The storage module 1871 may store various applications.

As described above, the storage 1620 may store programs of various configurations, and is not limited to the example shown in FIG. 18.

The communication interface 1630 may communicate with at least one of the external device 110, the server 120, and the AP 130. To perform communication, the communication interface 1630 may be configured to transmit/receive data via a wireless communication network such as wireless Internet, wireless Intranet, a wireless phone network, a wireless local area network (LAN), a Wi-Fi network, a Wi-Fi direct (WFD) network, a 3G network, a 4G Long Term Evolution (LTE) network, a Bluetooth network, an infrared data association (IrDA) network, a radio frequency identification (RFID) network, a ultra wideband (UWB) network, a Zigbee network, or a near field communication (NFC) network; however, the present invention is not limited thereto. In particular, the communication interface 1630 may include a global positioning system (GPS) module.

The processor 1640 may perform operations according to the above described exemplary embodiments by executing the programs stored in the storage 1620. The processor 1640 receives a first touch input representing reference information with respect to the external device 110 that is seen through the transparent display 1610, and a second touch input representing a selection on an object displayed on the external device 110. The processor 1640 requests information related to the object to the external device 110 based on the first and second touch inputs received via the communication interface 1630. When receiving the information related to the object from the external device 110 via the communication interface 1630, the processor 1640 displays the received information on the transparent display 1610.

Operations of the processor 1640 regarding the information display method according to the exemplary embodiments may be performed as described with reference to the flowcharts in FIGS. 2, 11, 12, 14, 15, and FIG. 21 that will be described later.

The sensor 1650 senses a current status of the transparent display device 100 such as location of the transparent display device 100, contact of the user on the transparent display device 100, orientation of the transparent display device 100, and acceleration or deceleration of the transparent display device 100 and generates a sensing signal for controlling operations of the transparent display device 100. In particular, the sensor 1650 may generate a sensing signal regarding the location of the transparent display device 100 in order to receive information based on the augmented reality service described with reference to FIGS. 10A through 10D.

Figure 19:
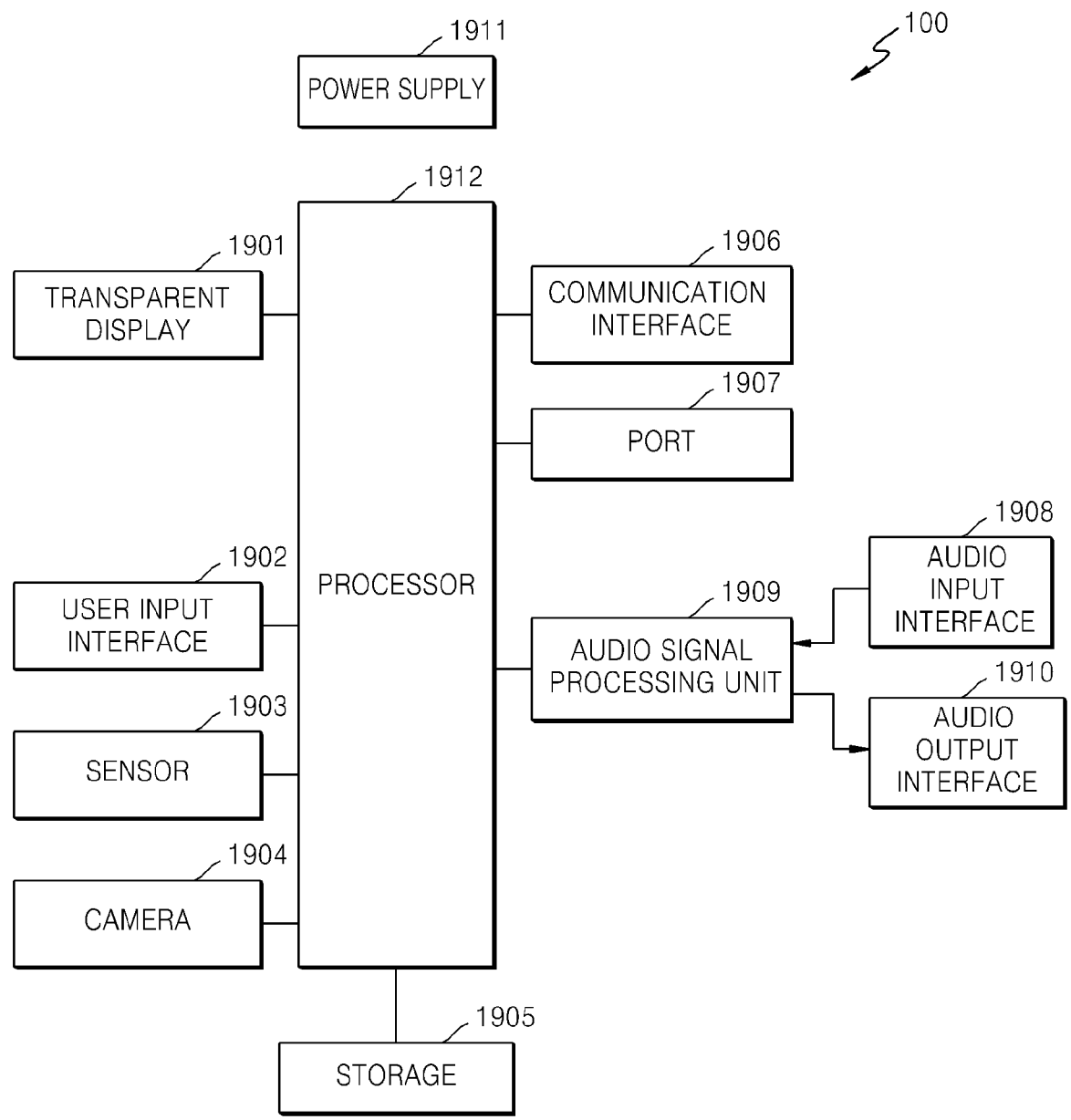
FIG. 19 is a functional block diagram of a transparent display device according to another exemplary embodiment.

FIG. 19 is a functional block diagram of the transparent display device 100 according to an exemplary embodiment.

Referring to FIG. 19, the transparent display device 100 may include a transparent display 1901, a user input interface 1902, a sensor 1903, a camera 1904, a storage 1905, a communication interface 1906, a port 1907, an audio input interface 1908, an audio signal processor 1909, an audio output interface 1910, a power supply 1911, and a processor 1912, but is not limited thereto. That is, the transparent display device 100 may include fewer components than those of FIG. 19, or may include additional components other than those of FIG. 19.

The transparent display 1901 may be referred to as a touch screen. The transparent display 1901 may display objects, and may receive a touch-based user input. The transparent display 1901 may receive the touch-based user input via at least one of a front surface and a rear surface of the transparent display 1901. To do this, the transparent display 1901 includes at least one touch sensor. The touch sensor may recognize the user input based on (x, y) coordinates. The touch sensor may include a sensor for recognizing a direct-touch, or a sensor for recognizing a proximity-touch.

The user input may be generated according to a request of a user based on gestures of the user, or user's selection. The gesture of the user may be variously defined by combinations of the number of touches, touch patterns, touch area, and touch intensity.

As described above with reference to the transparent display 1610 of FIG. 16, the transparent display 1901 is formed as a transparent device, and a transparency of the transparent display 1901 may be adjusted by adjusting light transmittance of the transparent device or by adjusting RGB value of each pixel. Also, the transparent display 1901 may have a structure in which an OLED and an LCD are combined. In the transparent display 1901, the OLED may be located adjacent to a front surface of the transparent display 1901, and the LCD may be located adjacent to a rear surface of the transparent display 1901.

The transparent display 1901 may display a screen respectively responding to a touch-based user input through at least one of the front and rear surfaces thereof, a user input based on the sensor 1903, a user input via the camera 1904, and a user input via the audio input interface 1908. The screen displayed on the transparent display 1901 may include a UI or a GUI screen.

The transparent display 1901 may have a physical structure like the transparent display 1610 described with reference to FIG. 16. Two or more transparent display 1901 may be formed according to the type of the transparent display device 100.

The user input interface 1902 generates input data (or control data) for controlling operations of the transparent display device 100 and a user input. The user input interface 1902 may include a keypad, a dome switch, a touch pad that is used instead of a mouse, a jog wheel, a jog switch, and a hardware (H/W) button.

The sensor 1903, like the sensor 1650 shown in FIG. 16, senses a current status of the transparent display device 100 such as location of the transparent display device 100, contact of the user on the transparent display device 100, orientation of the transparent display device 100, and acceleration or deceleration of the transparent display device 100 and generates a sensing signal for controlling operations of the transparent display device 100.

The sensor 1903 may include a sensor except for the sensors for sensing the direct touch or the proximate touch described regarding the transparent display 1901. For example, the sensor 1903 may include a proximity sensor. The proximity sensor is a sensor for detecting whether an object approaches a previously set deflection surface or whether the external object is present nearby by using a force of an electromagnetic field or an infrared ray without an actual physical touch. Examples of the proximity sensor include a transparent photoelectric sensor, a direct reflective photoelectric sensor, a mirror reflective photoelectric sensor, a high frequency oscillation photoelectric sensor, a capacitive photoelectric sensor, a magnetic photoelectric sensor, an infrared photoelectric sensor, etc.

The camera 1904 processes an image frame such as a still image or a moving image obtained from an image sensor in a conference call mode or a photographing mode. The processed image frame may be displayed on the transparent display 1901. The image frame processed by the camera 1904 may be stored in the storage 1905 or may be transmitted to another device through the communication interface 1906 or the port 1907. The device receiving the transmitted image frame may include at least one of the external device 110, the server 120, and the AP 130, but is not limited thereto.

The camera 1904 may also be configured to receive the user input to the front and rear surfaces of the transparent display 1901 or to photograph the object. The number of cameras 1904 may be two or more according to a structure of the transparent display device 100. The camera 1904 may be used as an input apparatus that recognizes a user's spatial gesture.

The storage 1905 stores at least one program configured to be executed by the processor 1912, which will be described later, and a resource. The at least one program includes a program that executes an information display method, an operating system (OS) program of the transparent display device 100, applications set in the transparent display device 100, and a program necessary for performing various functions (for example, communication function and display function) of the transparent display device 100.

The resource includes information necessary for executing the above-described programs, user interface screen information for performing the information display method mentioned in embodiments of the present invention, and the user input information recognized by the first and second touch inputs. The user input information recognized as the first and second touch inputs may be set based on the examples described with reference to FIGS. 3 through 10, but is not limited thereto.

The storage 1905 may be configured to independently include a storage that stores at least one program necessary for performing various functions of the transparent display device 100 and an operating system program, and a storage that stores one or more programs, resources, and various applications that execute the information display method.

The storage 1905 may include at least one type of storage medium among a flash memory type, a hard disk type, a multimedia card micro type, and a card type memory (for example, an SD or XD memory), a read only memory (ROM), an electronically erasable programmable read-only memory (EEPROM), a programmable read only memory (PROM) magnetic memory, and an optical disk.

The communication interface 1906 may be configured to transmit data to and receive data from at least one of the external device 110, a server (120), and AP (130) via a wireless communication network such as wireless Internet, wireless Intranet, a wireless phone network, a wireless local area network (LAN), a Wi-Fi network, a Wi-Fi direct (WFD) network, a 3G network, a 4G Long Term Evolution (LTE) network, a Bluetooth network, an infrared data association (IrDA) network, a radio frequency identification (RFID) network, a ultra wideband (UWB) network, a Zigbee network, or a near field communication (NFC) network, but is not limited thereto.

The communication interface 1906 may include at least one of a broadcasting reception module, a mobile communication module, a wireless Internet module, a wired Internet module, a short distance communication module, and a location information module but is not limited thereto.

The broadcasting reception module receives a broadcasting signal and/or broadcasting related information from an external broadcasting management server through a broadcasting channel. The broadcasting channel may include a satellite channel and a terrestrial channel. The mobile communication module transmits and receives a wireless signal to and from at least one of a base station, the external device 110, and the server 120 over a mobile communication network. The wireless signal may include various types of data according to a voice call signal, a conference phone call, or transmission/reception of a text/multimedia message. The wireless Internet module is a module for a wireless Internet connection. The wired Internet module is a module for a wired Internet connection.

The short distance communication module is a module for short distance communication. Short distance communication technologies may use Bluetooth, RFID, IrDA, UWB, Zigbee, WFD, NFC, etc. Like the exemplary embodiment shown in FIG. 14, the information about the object displayed on the external device 110 and the screen size information may be received via the short distance communication module. For example, when using the NFC communication method and a distance between the external device 110 and the transparent display device 100 is within a radius of the short distance communication based on the NFC, the transparent display device 100 may read or receive the above information from the external device 110.

The location information module is a module for identifying or obtaining the location of the transparent display device 100. As an example, a GPS module may be used. The GPS module receives location information from a plurality of satellites. The location information may include coordinate information represented by latitude and longitude.

The port 1907 may transmit and receive data to and from the external device 110 by using a plug and play interface such as a USB port. The plug and play interface is a module that automatically detects and enables use of (i.e., play) if the external device 110 is plugged into the transparent display device 100. The device is not limited to the external device 110.

The audio input interface 1908 receives an input of an external sound signal in a call mode, a recording mode, or a voice recognition mode, etc. The audio input interface 1908 may be configured as, for example, a microphone. The audio input interface 1908 may be configured to include various noise removal algorithms for removing noise that occurs during the process of receiving the input of the external sound signal.

The sound signal input by using the audio input interface 1908 may be user's input representing a selection on the object displayed on the external device 110 that is seen through the transparent display unit 1901 according to an exemplary embodiment. The sound signal input by using the audio input interface 1908 may be stored in the storage 1905 or may be transmitted to the outside through the communication interface 1906 or the port 1907. The outside may include the external device 110, other external devices (not shown), the server 120, and the AP 130.

The audio signal processing unit 1909 provides an interface between the audio input interface 1908 and the processor 1912 and between the audio output interface 1910 and the processor 1912. That is, the audio signal processing unit 1909 converts the sound signal received from the audio input interface 1908 into audio data that may be processed by the processor 1912 and transmits the audio data to the processor 1912. The audio signal processing unit 1909 converts the audio data transmitted from the processor 1912 into an electrical sound signal and transmits the electrical sound signal to the audio output interface 1910.

The audio output interface 1910 outputs the sound signal or the audio signal received from the audio signal processing unit 1909 in the call mode or an audio production mode. The audio output interface 1910 may be configured as a speaker. The audio input interface 1908 and the audio output interface 1910 may be integrally configured like a head set.

The transparent display 1901, the user input interface 1902, the sensor 1903, the camera 1904, and the audio input interface 1908 may be referred to as input apparatuses or input/output apparatuses according to a function of a user interface between the transparent display device 100 and the user. For example, in a case where the function of the user interface between the transparent display device 100 and the user includes a touch screen function, a sound recognition function, and a spatial gesture recognition function, the user input interface 1902, the sensor 1903, the camera 1904, and the audio input interface 1908 may be referred to as the input apparatuses, and the transparent display 1901 may be referred to as the input/output apparatus.

The power supply 1911 supplies power to various elements of the transparent display device 100. The power supply 1911 includes one or more power sources such as a battery and an alternating current (AC) power source. The transparent display device 100 may not include the power supply 1911 but may include a connection unit (not shown) that may be connected to an external power supply (not shown).

The processor 1912 may be referred to as one or more processors that control a general operation of the transparent display device 100. Although the processor 1912 is implemented as a single chip in FIG. 19, the processor 1912 may be divided into a plurality of processors according to a function of the transparent display device 100.

The processor 1912 may generally control the transparent display 1901, the user input interface 1902, the sensor 1903, the camera 1904, the storage 1905, the communication interface 1906, the port 1907, the audio input interface 1908, the audio signal processing unit 1909, and the audio output interface 1910. Thus, the processor 1912 may be referred to as a controller, a microprocessor, a digital signal processor, etc.

The processor 1912 may also provide user's input that is input through the transparent display 1901, the user input interface 1902, the sensor 1903, the camera 1904, and the audio input interface 1908 that correspond to input apparatuses and a user interface based on the transparent display 1901.

The processor 1912 may execute at least one program related to the information display method according to the exemplary embodiments. The processor 1912 may execute the program by reading the program from the storage 1905 or downloading the program from an external apparatus such as an application providing server (not shown) or a market server (not shown) through the communication interface 1906.

The processor 1912 may be understood to include an interface function unit interfacing between various functional modules and the processor 1912 of the transparent display device 100. The operation of the processor 1912 related to the information display method according to the exemplary embodiments may be performed as shown in flowcharts of FIGS. 2, 11, 12, 14, 15, and 21 that will be described later.

Figure 20:
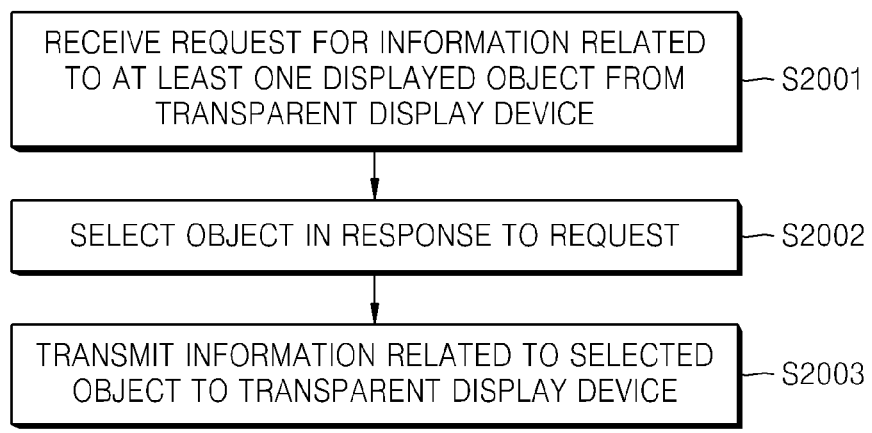
FIG. 20 is a flowchart illustrating a method of displaying information to be performed by an external device, according to an exemplary embodiment.

FIG. 20 is a flowchart illustrating operations of the external device 110 according to an exemplary embodiment.

In operation S2001, the external device 110 receives a request for information related to at least on object displayed on the external device 110 from the transparent display device 100. The request for information may be transmitted via at least one of the direct communication between the devices, the communication via a server, and the communication via a repeater.

The request for information related to the object may be input based on the first touch input and the second touch input to the transparent display device 100. The first touch input is a user input to the transparent display device 100 for representing the reference information about the external device 110 that is seen through the transparent display device 100. The second touch input is a user input to the transparent display device 100 for selecting at least one object displayed on the external device 110 that is seen through the transparent display device 100.

The request for information related to the object may include the displayed location information (coordinate information) of the selected object on the external device 110 as described in the above exemplary embodiments, the screen size of the transparent display device 100, and the coordinate information of the first and second touch inputs on the transparent display device 100, but is not limited thereto.

Figure 21:
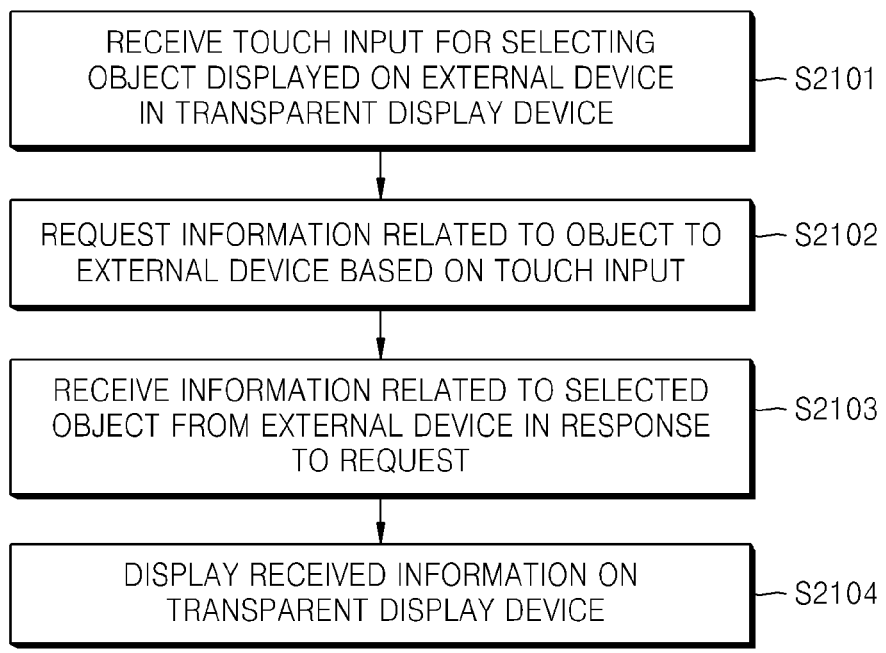
FIG. 21 is a flowchart illustrating a method of displaying information to be performed by a transparent display device according to another exemplary embodiment.

However, when the transparent display device 100 operates as the flowchart shown in FIG. 21, the request for information related to the object may be based on the touch input corresponding to the second touch input.

In operation S2002, the external device 110 selects an object in response to the received request for the information related to the object. For example, if the requested object is an icon, the external device 110 selects the icon of the requested object and the application program connected to the icon. If the requested object is a folder, the external device 110 selects the requested folder and files or data located at a lower layer of the folder. If the requested object is an object included in one screen, the external device 110 selects the object by using the coordinate information included in the received request. If the requested object is a plurality of objects included in one screen, the external device 110 respectively selects the plurality of objects by using the coordinate information of the object included in the received request.

In operation S2003, the external device 110 transmits information related to the selected object to the transparent display device 100. The information related to the object is transmitted to the transparent display device 100 in the same manner as the request for the information is received, but is not limited thereto. For example, the request for the information may be received via the direct communication between the devices, and the information related to the object selected in response to the request may be transmitted to the transparent display device 100 via the repeater or the server.

FIG. 21 is a flowchart illustrating a method of displaying information on a transparent display device according to another exemplary embodiment. FIG. 21 shows a case where the second touch input mentioned with reference to FIG. 2 is used.

In operation S2101, the transparent display device 100 receives a touch input for selecting an object displayed on the external device 110 that is seen through the transparent display device 100. Here, the touch input corresponds to the second touch input mentioned in FIGS. 2 through 10. The information about the external device 110 that is seen through the transparent display device 100 may be the same as that mentioned in FIGS. 1 through 10.

In operation S2102, the transparent display device 100 requests the external device 110 for information related to the object selected based on the touch input. A signal for requesting information related to the object selected based on the touch input transmitted to the external device 110 includes a signal for requesting information related to the object selected based on the second touch input mentioned in FIGS. 2 through 10.

In operation S2103, the transparent display device 100 receives information about the selected object from the external device 110. The received information corresponds to the request signal in operation S2102, and may be the same as the information received in operation S203 shown in FIG. 2.

In operation S2104, the transparent display device 100 displays the received information. The received information may be displayed in the same manner as that of operation S204 shown in FIG. 2.

The flowchart shown in FIG. 21 may be modified to include the operation S1105 shown in FIG. 11 so that the object displayed on the transparent display device 100 may be edited based on the interaction between the transparent display device 100 and the external device 110.

The information display method according to exemplary embodiments may also be embodied as computer readable codes on a computer readable recording medium. The computer readable medium may be any recording apparatus capable of storing data that is read by a computer system, e.g., a read-only memory (ROM), a random access memory (RAM), a compact disc (CD)-ROM, a magnetic tape, a floppy disk, an optical data storage device, and so on. The computer readable medium may be distributed among computer systems that are interconnected through a network, and the present invention may be stored and implemented as computer readable code in the distributed system.

While the exemplary embodiments have been particularly shown and described, it will be understood by those of ordinary skill in the art that various changes in form and details may be made therein without departing from the spirit and scope of the present invention as defined by the following claims.

What is claimed is:

1. A method of displaying information on a transparent display device, the method comprising:
   receiving a first touch input on a screen of the transparent display device indicating first position information of an external device that is viewable through the screen of the transparent display device;

determining first coordinates of the external device on the transparent display device as seen through the transparent display device based on the first touch input;

receiving a second touch input on the screen of the transparent display device indicating second position information of an object displayed on a screen of the external device viewable through the screen of the transparent display device;

determining second coordinates of the object displayed on the screen of the external device viewable through the screen of the transparent display device based on the second touch input;

determining relationship information between the first coordinates and the second coordinates;

requesting the external device for information related to the object based on the first coordinates, the second coordinates, and the relational information;

receiving information related to the object from the external device in response to the requesting; and displaying the received information on the screen of the transparent display device.

2. The method of claim 1, wherein the first touch input indicates a contour line of the external device viewable through the screen of the transparent display device.

3. The method of claim 1, wherein the first touch input comprises independent touch operations on a first point and a second point on the screen of the transparent display device that indicate a contour line of the external device that is viewable through the screen of the transparent display device.

4. The method of claim 1, wherein the first touch input is one of a touch-and-drag operation for connecting a first point and a second point on the screen of the transparent display device that indicates a contour line of the external device that is viewable through the screen of the transparent display device and a touch input indicating a touch-based region adjusting operation for guide information displayed on the screen of the transparent display device, and a range related to the touch-based region adjusting operation for the guide information is based on a contour line of the external device that is viewable through the screen of the transparent display device.

5. The method of claim 1, wherein the first touch input is a touch operation for selecting screen information of the external device,
wherein the screen information is included in a selectable screen information menu item about the external device, which is displayed on the screen of the transparent display device,
wherein the screen information comprises at least one of screen size information and screen type information.

6. The method of claim 1, wherein the second touch input indicates a contour line of the object that is viewable through the screen on the transparent display device.

7. The method of claim 1, wherein the second touch input is a tap-based touch indicating a location on the screen of the transparent display device at which the object is viewable through the screen of the transparent display device.

8. The method of claim 1, wherein the second touch input indicates a closed region on the screen of the transparent display device through which the object is viewable on the screen of the transparent display device.

9. The method of claim 1, wherein the information related to the object indicates at least one other object having a type that is the same as a type of the object, and a display location on the screen of the external device of the at least one other object differs from that of the object.

10. The method of claim 1, further comprising editing the information that is displayed on the screen of the transparent display device based on an interaction between the transparent display device and the external device.

11. A transparent display device comprising:
a transparent display configured to receive a touch input indicating first position information of an external device that is viewable through the transparent display, and to receive a second touch input indicating second position information of an object displayed on a screen of the external device viewable through the transparent display;
a communication unit configured to communicate with the external device; and
a processor configured to determine first coordinates of the external device on the transparent display device as seen through the transparent display device based on the first touch input, determine second coordinates of the object displayed on the screen of the external device viewable through the screen of the transparent display device based on the second touch input, determine relational information between the first coordinates and the second coordinates, request the external device for information related to the object based on the first coordinates, the second coordinates, and the relational information, via the communication unit, receive information related to the object from the external device in response to the request, via the communication unit, and
display the received information on the transparent display.

12. The transparent display device of claim 11, wherein the first touch input indicates a contour line of the external device viewable through the transparent display and the second touch input indicates a contour line of the object that is viewable through the transparent display.

13. The transparent display device of claim 11, wherein the first touch input comprises independent touch operations on a first point and a second point on the transparent display that indicate a contour line of the external device that is viewable through the transparent display.

14. The transparent display device of claim 11, wherein the first touch input is one of a touch-and-drag operation for connecting a first point and a second point on the transparent display that indicate a contour line of the external device that is viewable through the transparent display and a touch input indicating a touch-based region adjusting operation for guide information displayed on the transparent display, and a range of the touch-based region adjusting operation for the guide information is based on a contour line of the external device that is viewable through the transparent display.

15. The transparent display device of claim 11, wherein the first touch input is a touch operation for selecting screen information of the external device,
wherein the screen information is included in a selectable screen information menu item about the external device, which is displayed on the transparent display,
wherein the screen information comprises at least one of screen size information and screen type information,
wherein the screen information menu item is stored in the storage unit,
wherein the screen information menu item is read by the processor from the storage unit and displayed on the transparent display.

16. The transparent display device of claim 11, wherein the second touch input is based on a tap-based touch indicating a location of the transparent display at which the object is viewable through the transparent display.

17. The transparent display device of claim 11, wherein the second touch input indicates a closed region on the transparent display through which the object is viewable through the transparent display.

18. The transparent display device of claim 11, wherein the information related to the object indicates at least one other object having a type that is the same as a type of the object, wherein a display location on the screen of the external device of the at least one other object differs from that of the object.

19. The transparent display device of claim 11, wherein the processor is further configured to edit the received information that is displayed on the transparent display based on an interaction between the transparent display device and the external device via the communication unit.

20. A non-transitory computer-readable recording medium having embodied thereon a program which when executed implements a method of displaying information to be performed by a transparent display device, the method comprises:

receiving a first touch input on a screen of the transparent display device indicating first position information of an external device that is viewable through the screen of the transparent display device;

determining first coordinates of the external device on the transparent display device as seen through the transparent display device based on the first touch input;

receiving a second touch input on the screen of the transparent display device indicating second position information of an object displayed on a screen of the external device viewable through the screen of the transparent display device;

determining second coordinates of the object displayed on the screen of the external device viewable through the screen of the transparent display device based on the second touch input;

determining relationship information between the first coordinates and the second coordinates;

requesting the external device for information related to the object based on the first coordinates, the second coordinates, and the relational information;

receiving information related to the object from the external device in response to the requesting; and displaying the received information on the screen of the transparent display device.

* * * * *